(12) United States Patent
Unzueta et al.

(10) Patent No.: US 12,511,992 B2
(45) Date of Patent: Dec. 30, 2025

(54) ONLINE OCCLUSION PREDICTION FOR AUTONOMOUS VEHICLES

(71) Applicant: GM Cruise Holdings LLC, San Francisco, CA (US)

(72) Inventors: Marc Unzueta, Munich (DE); Michael Meyer, Munich (DE); Sven Möller, Lubbecke (DE); Filippo Grazioli, Heidelberg (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 166 days.

(21) Appl. No.: 18/460,263

(22) Filed: Sep. 1, 2023

(65) Prior Publication Data
US 2025/0078651 A1    Mar. 6, 2025

(30) Foreign Application Priority Data

Aug. 31, 2023 (EP) .................................... 23194555

(51) Int. Cl.
| | |
|---|---|
| *G08G 1/01* | (2006.01) |
| *G01C 21/00* | (2006.01) |
| *G06T 7/246* | (2017.01) |
| *G06T 7/73* | (2017.01) |
| *G06V 20/58* | (2022.01) |

(Continued)

(52) U.S. Cl.
CPC ....... *G08G 1/0141* (2013.01); *G01C 21/3893* (2020.08); *G06T 7/248* (2017.01); *G06T 7/74* (2017.01); *G06V 20/58* (2022.01); *G08G 1/0112* (2013.01); *G08G 1/017* (2013.01); *G08G 1/04* (2013.01); *G06T 2207/20081* (2013.01); *G06T 2207/20084* (2013.01); *G06T 2207/30241* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 2020/0017117 A1* | 1/2020 | Milton | ................ G08G 1/0112 |
| 2020/0104289 A1* | 4/2020 | Premawardena | ..... G06F 16/182 |

(Continued)

OTHER PUBLICATIONS

European Patent Office, European Search Report for EP Patent Application No. 23194555.1, Feb. 21, 2024.

*Primary Examiner* — Abby J Flynn
*Assistant Examiner* — Bakari Underwood
(74) *Attorney, Agent, or Firm* — CANTOR COLBURN LLP

(57) ABSTRACT

Autonomous vehicles (AVs) utilize perception and understanding of objects on the road to predict behaviors of the objects, and to plan a trajectory for the vehicle. In some scenarios, an AV may benefit from having information about an object that is not within a perceivable area of the sensors of the AV. Another AV in the area that has the object within a perceivable area of the sensors of the other AV may share information with the AV. Rich information about the object determined by the other AV can be compressed using an encoder and transferred efficiently to the AV for inclusion in a temporal map that combines locally determined object information and transferred object information determined by other AV(s). The temporal map may be used in one or more parts of the software stack of the AV.

19 Claims, 11 Drawing Sheets

(51) Int. Cl.
   *G08G 1/017*      (2006.01)
   *G08G 1/04*       (2006.01)

(56)         References Cited
          U.S. PATENT DOCUMENTS

2023/0059897 A1* 2/2023 Miucic .................... H04W 4/44
2023/0125048 A1* 4/2023 Iguchi ...................... G06T 9/40
                                                    382/232

* cited by examiner

ONLINE OCCLUSION PREDICTION FOR AUTONOMOUS VEHICLES

PRIORITY INFORMATION

This application claims priority to European patent application number EP23194555.1 (File No. to be used for priority declarations: EP23194555; Applicant: GM CRUISE HOLDINGS LLC) filed on 31 Aug. 2023, titled "ONLINE OCCLUSION PREDICTION FOR AUTONOMOUS VEHICLES". The European patent application is hereby incorporated by reference in its entirety.

BACKGROUND

Technical Field

The present disclosure generally relates to autonomous vehicles (AVs) and, more specifically, to sharing of object information about objects between AVs in an area.

Introduction

AVs, also known as self-driving cars, and driverless vehicles, may be vehicles that use multiple sensors to sense the environment and move without human input. Automation technology in AVs may enable vehicles to drive on roadways and to perceive the vehicle's environment accurately and quickly, including obstacles, signs, and traffic lights. Autonomous technology may utilize geographical information and semantic objects (such as parking spots, lane boundaries, intersections, crosswalks, stop signs, and traffic lights) for facilitating vehicles in making driving decisions. The vehicles can be used to pick-up passengers and drive the passengers to selected destinations. The vehicles can also be used to pick-up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details that provide a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

Figure 1:
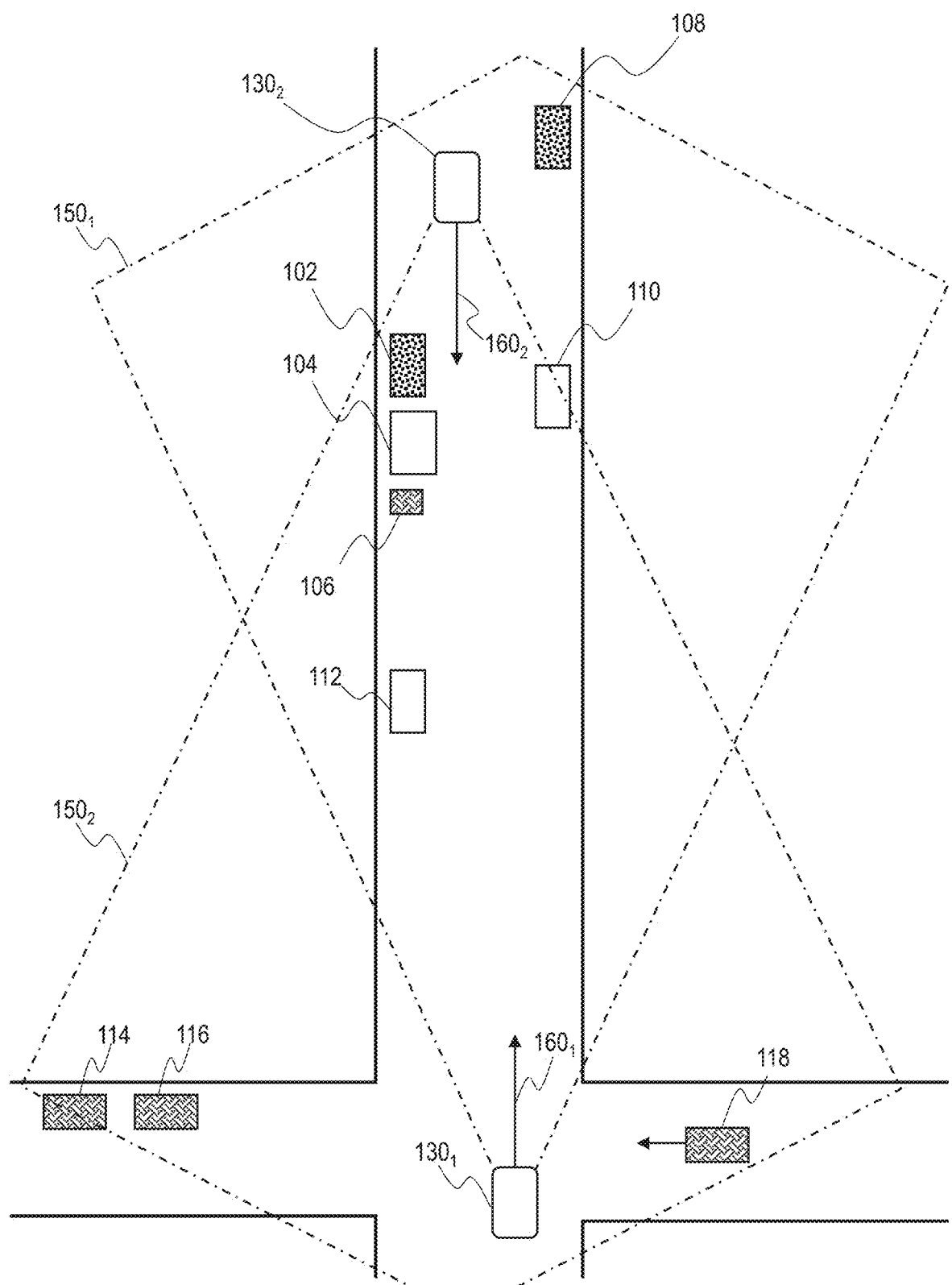
FIG. 1 illustrates objects that may be outside observable or perceivable areas for AVs in a first scenario, according to some aspects of the disclosed technology.
Figure 2:
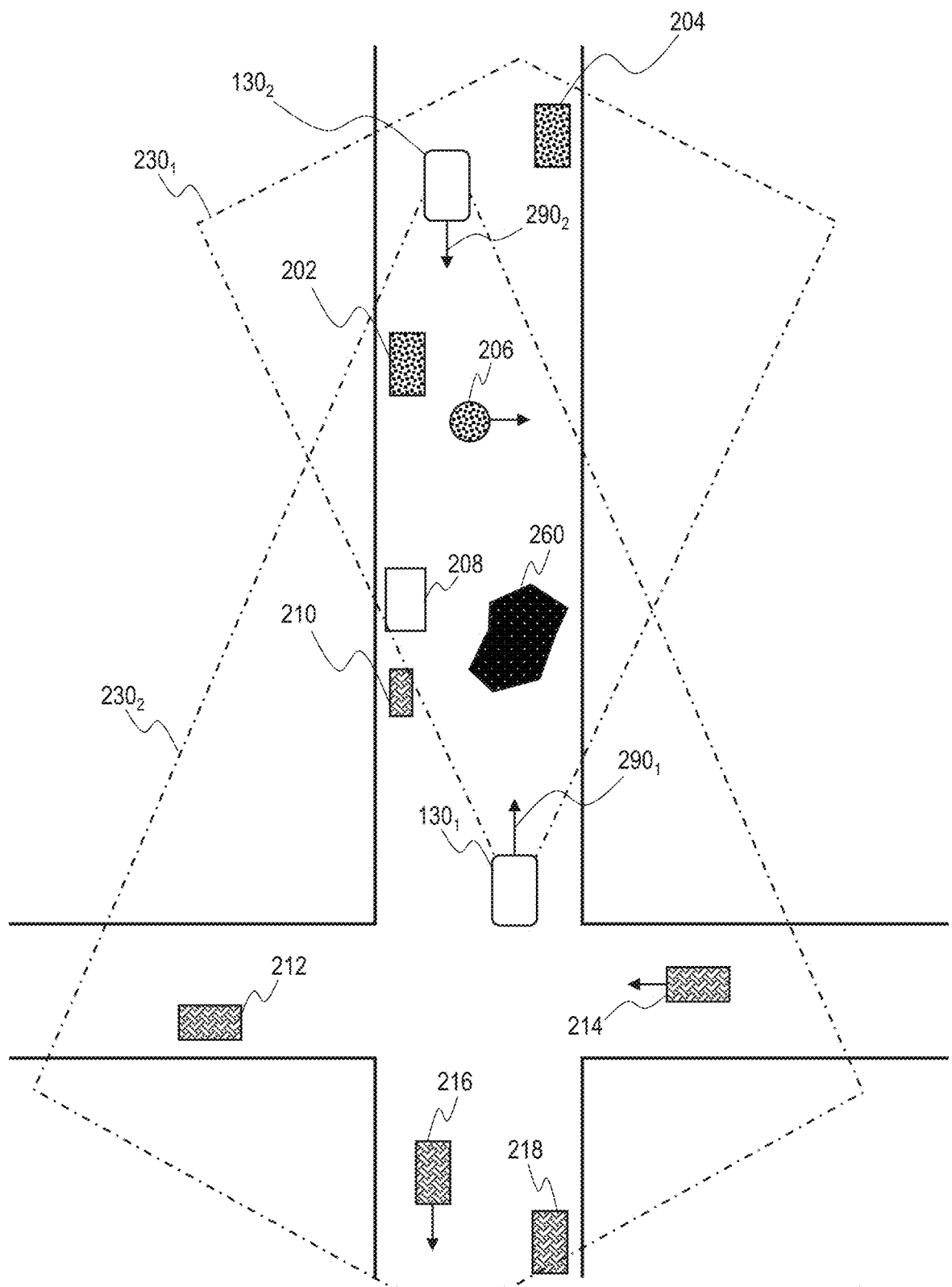
FIG. 2 illustrates objects that may be outside observable or perceivable areas for AVs in a second scenario, according to some aspects of the disclosed technology.

AVs can provide many benefits. For instance, AVs may have the potential to transform urban living by offering an opportunity for efficient, accessible, and affordable transportation. AVs utilize perception and understanding of objects on the road to predict behaviors of the objects, and to plan a trajectory for the vehicle. In some scenarios, an AV may benefit from having information about an object that is not within an observable or perceivable area of the sensors of the AV. Some examples of such scenarios are illustrated in FIGS. 1-2.

Another AV in the area that has the object within an observable or perceivable area of the sensors of the other AV may share information with the AV. AVs in a fleet of AVs can share information via vehicle to vehicle communication, e.g., if AVs are in an area (e.g., having a certain radius) or within a certain distance of each other. AVs in a fleet of AVs can share information via a remote joint map management system in the cloud.

Rich information about the object determined by the other AV can be compressed using an encoder and transferred efficiently to the AV for inclusion in a temporal map that combines locally determined object information and transferred object information determined by other AV(s). The temporal map may be used in one or more parts of the software stack of the AV. The rich information may be timestamped so that the information can be used even if certain amount of time has lapsed since the information was transferred. The AV may ingest the timestamped information about the object in one or more parts of the AV stack.

The rich information about the object determined by one or more AVs in a fleet or a group can be compressed using an encoder and transferred efficiently to a remote joint map management system. The rich information may be translated into the common reference frame shared by the fleet of vehicles. The remote joint map management system can include one or more temporal maps that combine locally determined object information and transferred object information determined by the one or more AVs in the fleet, effectively crowdsourcing information from the AVs in the fleet. AVs in the fleet can query the remote joint map management system to obtain information about objects in a scene (which may be generated and/or provided by one or more AVs in the fleet).

Having information about objects outside of the observable or perceivable area of the sensors of the AV (e.g., before the sensors of the AV would "see" the object) can enable the AV to better locate, understand, and predict behaviors of objects in the surrounding area, and plan a collision-free path with higher confidence. Having a better understanding of the objects in the area can enable the AV to drive at higher speeds with greater confidence. The information about the objects outside of the observable area of the sensors can positively impact the AV stack operations online, or while the AV is navigating in an area and on roadways. The information about the objects may be used by perception, understanding, tracking, prediction, and/or planning parts of the AV stack. The information about the objects outside of the observable area of the sensors may be used offline to train machine learning models of the AV stack so that the machine learning models can better handle scenarios where certain objects are not observable but the information about those objects are reported by other AVs in the area.

Various embodiments herein and their advantages may apply to a wide range of vehicles and fleets having a variety of different types of vehicles, (e.g., fully autonomous vehicles, semi-autonomous vehicles, vehicles with driver-assist functionalities, etc.), and not just AVs.

Exemplary Scenarios where Objects May be Occluded, or May be Outside an Observable or Perceivable Area In dense urban areas, there may be many scenarios or scenes in which objects on the road are fully outside of an observable or perceivable area of the sensors of the AV. Some objects may be out of range of detection by the sensors. Some objects may be occluded by structures, buildings, or other objects. Some objects may be unobservable or imperceivable due to atmospheric or weather conditions (e.g., steam, smoke, rain, snow, fog, etc.). Some objects may not be visible to the sensors or detectable by the sensors for other reasons (e.g., camera lens glare, dirt on sensors, tampering with the sensors, etc.). Not being able to observe certain objects in an area can affect how well or how confidently the AV can navigate in the area. Not being able to observe certain objects may impact how well the AV can predict behaviors of objects in the area (including objects which are observable or perceivable). Objects which may be outside of an observable or perceivable area may include: small objects (e.g., pets/animals, pedestrians), objects with high velocity, objects with erratic behavior, objects lying on the ground, debris on the road, objects with high velocity near an intersection with tall buildings. A fleet of AVs or a group of AVs may operate in a dense urban area where a plurality of AVs may be near or within an area or geographical area of the dense urban area at the same time or during a short time period.

FIG. 1 illustrates objects that may be outside observable or perceivable areas for AVs in a first scenario, according to some aspects of the disclosed technology. In the first scenario, AV $130_1$ and AV $130_2$ are operating within an area or geographical area. Two AVs are illustrated but it is envisioned by the disclosure that more than two AVs may be operating in the area. Arrow $160_1$ illustrates a direction of travel for AV $130_1$. Arrow $160_2$ illustrates a direction of travel for AV $130_2$.

AV $130_1$ may query other AVs in the fleet, e.g., AV $130_2$, within a certain area of interest for information about objects detected by other AVs. An exemplary area of interest for AV $130_1$ is shown as region $150_1$. In some cases, AV $130_1$ may query information from a remote joint map management system, which collects information about objects detected by one or more AVs in the fleet. AV $130_1$ may query information about objects within an area of interest from a remote joint map management system.

The area of interest may be defined based on a radius from the location of AV $130_1$. For example, the area of interest may include a circular region defined based on the radius encompassing 360 degrees surrounding the AV. In some cases, the area of interest may be defined based on the maneuver that an AV is performing. For example, if an AV is driving forward normally, the area of interest may include a conical or semi-circular region defined based on the radius encompassing 180 degrees or less than 180 degrees in front of the AV. In another example, if an AV is performing a pullover maneuver and/or a parking maneuver, the area of interest may include a circular region defined based on the radius encompassing 360 degrees surrounding the AV. The area of interest may be defined based on the direction of travel of AV $130_1$ and optionally the velocity of AV $130_1$, so that the area of interest may include a region in front of AV $130_1$ based on a distance in front of AV $130_1$. The distance in front of AV $130_1$ may be longer if the velocity of AV $130_1$ is higher. The area of interest may be defined based on a characteristic of the location of AV $130_1$. The area of interest may be larger if AV $130_1$ is located near or at an intersection. The area of interest may be larger if AV $130_1$ is about to approach or arrive at an intersection. The area of interest may be larger if AV $130_1$ is about to approach or arrive at an area with a hill where objects on the other side of the hill may often be occluded. The area of interest may be larger if AV $130_1$ is about to approach a blind turn or blind corner. The area of interest may be larger if AV $130_1$ is located in an urban area (as opposed to a suburban area or rural area). The area of interest may be larger if the speed limit at the location of AV $130_1$ is higher. The area of interest may be larger if a number of tracked objects surrounding AV $130_1$ is higher. The area of interest may be defined based on a combination of factors or a weighted combination of factors.

Similarly, AV $130_2$ may have an area of interest including region $150_2$. AV $130_2$ may query other AVs in the fleet, e.g., AV $130_1$, within a certain area of interest for information about objects detected by other AVs. AV $130_2$ may query information from a remote joint map management system, which collects information about objects detected by one or more AVs in the fleet. AV $130_2$ may query information about objects within a certain area of interest from the remote joint map management system.

AV $130_1$ may have several objects within an observable or perceivable area for the sensors of AV $130_1$. AV $130_1$ may have detected object 114, object 116, object 118, object 112, object 106, object 104, and object 110 based on sensor data generated by sensors of AV $130_1$. AV $130_1$ may have detected AV $130_2$ based on sensor data generated by sensors of AV $130_1$. For AV $130_1$, object 102 and object 108 may be outside of an observable or perceivable area for the sensors of AV $130_1$. Object 102 (e.g., a parked vehicle) may be occluded by object 104. Object 108 (e.g., a parked vehicle) may be occluded by object 110. AV $130_1$ may benefit from receiving information about object 102 and object 108 from another AV, such as AV $130_2$, and/or from a remote joint map management system. The information may assist AV $130_1$ in determining expected behaviors of object 102 and object 108 (and other objects as well, if other objects may behave differently in the presence of object 102 and object 108) as AV $130_1$ drives forward.

AV $130_2$ may have several objects within an observable or perceivable area for the sensors of AV $130_2$. AV $130_2$ may have detected object 108, object 110, object 102, object 104, object 112. based on sensor data generated by sensors of AV $130_1$. AV $130_2$ may have detected AV $130_1$ based on sensor data generated by sensors of AV $130_2$. For AV $130_2$, object 106, object 114, object 116, and object 118 may be outside of an observable or perceivable area for the sensors of AV $130_2$. Object 106 (e.g., an idling motorcycle) may be occluded by object 104. Object 114 and object 116 (e.g., parked vehicles) may be occluded by building structures. Object 118 (e.g., a moving vehicle) may be occluded by building structures. AV $130_2$ may benefit from receiving information about object 106, object 114, object 116, and object 118 from another AV, such as AV $130_1$, and/or from a remote joint map management system. The information may assist AV $130_2$ in determining expected behaviors of object 106, object 114, object 116, and object 118 (and other objects as well, if other objects may behave differently in the presence of these objects) as AV $130_2$ drives forward and through the intersection.

FIG. 2 illustrates objects that may be outside observable or perceivable areas for AVs in a second scenario, according to some aspects of the disclosed technology. In the second scenario, AV $130_1$ and AV $130_2$ are operating within an area or geographical area. Two AVs are illustrated but it is envisioned by the disclosure that more than two AVs may be operating in the area. Arrow $290_1$ illustrates a direction of travel for AV $130_1$. Arrow $290_2$ illustrates a direction of travel for AV $130_2$.

AV $130_1$ may query other AVs in the fleet, e.g., AV $130_2$, within a certain area of interest for information about objects detected by other AVs. In some cases, AV $130_1$ may query information from a remote joint map management system, which collects information about objects detected by one or more AVs in the fleet. AV $130_1$ may query information about objects within an area of interest from a remote joint map management system. The area of interest may be defined in a same or similar manner as the first scenario in FIG. 1. An exemplary area of interest for AV $130_1$ is shown as region $230_1$. Similarly, AV $130_2$ may have an area of interest including region $230_2$. AV $130_2$ may query other AVs in the fleet, e.g., AV $130_1$, within a certain area of interest for information about objects detected by other AVs. In some cases, AV $130_2$ may query information from a remote joint map management system, which collects information about objects detected by one or more AVs in the fleet. AV $130_2$ may query information about objects within the certain area of interest from a remote joint map management system.

AV $130_1$ may have several objects within an observable or perceivable area for the sensors of AV $130_1$. AV $130_1$ may have detected object 212, object 214, object 216, object 218, object 210, object 208, and object 260 based on sensor data generated by sensors of AV $130_1$. For AV $130_1$, AV $130_2$, object 202, object 204, and object 206 may be outside of an observable or perceivable area for the sensors of AV $130_1$. Object 202 (e.g., a parked vehicle), object 204 (e.g., a parked vehicle), and object 206 (e.g., a pedestrian crossing the road) may be occluded by object 260. AV $130_2$ may be occluded by object 260 (e.g., oversized truck). AV $130_1$ may benefit from receiving information about AV $130_2$, object 202, object 206, and object 204 from another AV, such as AV $130_2$, and/or from a remote joint map management system. The information may assist AV $130_1$ in determining expected behaviors of AV $130_2$, object 202, object 206, and object 204 (and other objects as well, if other objects may behave differently in the presence of AV $130_2$, object 202, object 206, and object 204) as AV $130_1$ drives forward.

AV $130_2$ may have several objects within an observable or perceivable area for the sensors of AV $130_2$. AV $130_2$ may have detected object 202, object 206, object 204, object 208, and object 260. based on sensor data generated by sensors of AV $130_1$. For AV $130_2$, AV $130_1$, object 210, object 212, object 216, object 218, and object 214 may be outside of an observable or perceivable area for the sensors of AV $130_2$. Object 210 (e.g., a bicycle) may be occluded by object 208. Object 212 (e.g., parked vehicle) may be occluded by building structures. Object 214 (e.g., a moving vehicle) may be occluded by building structures. Object 216 (e.g., a moving vehicle) and object 218 (e.g., a parked vehicle) may be occluded or obstructed due to a hill. AV $130_1$ may be occluded by object 260 (e.g., oversized truck). AV $130_2$ may benefit from receiving information about AV $130_1$, object 212, object 214, object 216, object 218, and object 210 from another AV, such as AV $130_1$, and/or from a remote joint map management system. The information may assist AV $130_2$ in determining expected behaviors of AV $130_1$, object 212, object 214, object 216, object 218, and object 210 (and other objects as well, if other objects may behave differently in the presence of these objects) as AV $130_2$ drives forward and through the intersection.

Figure 3:
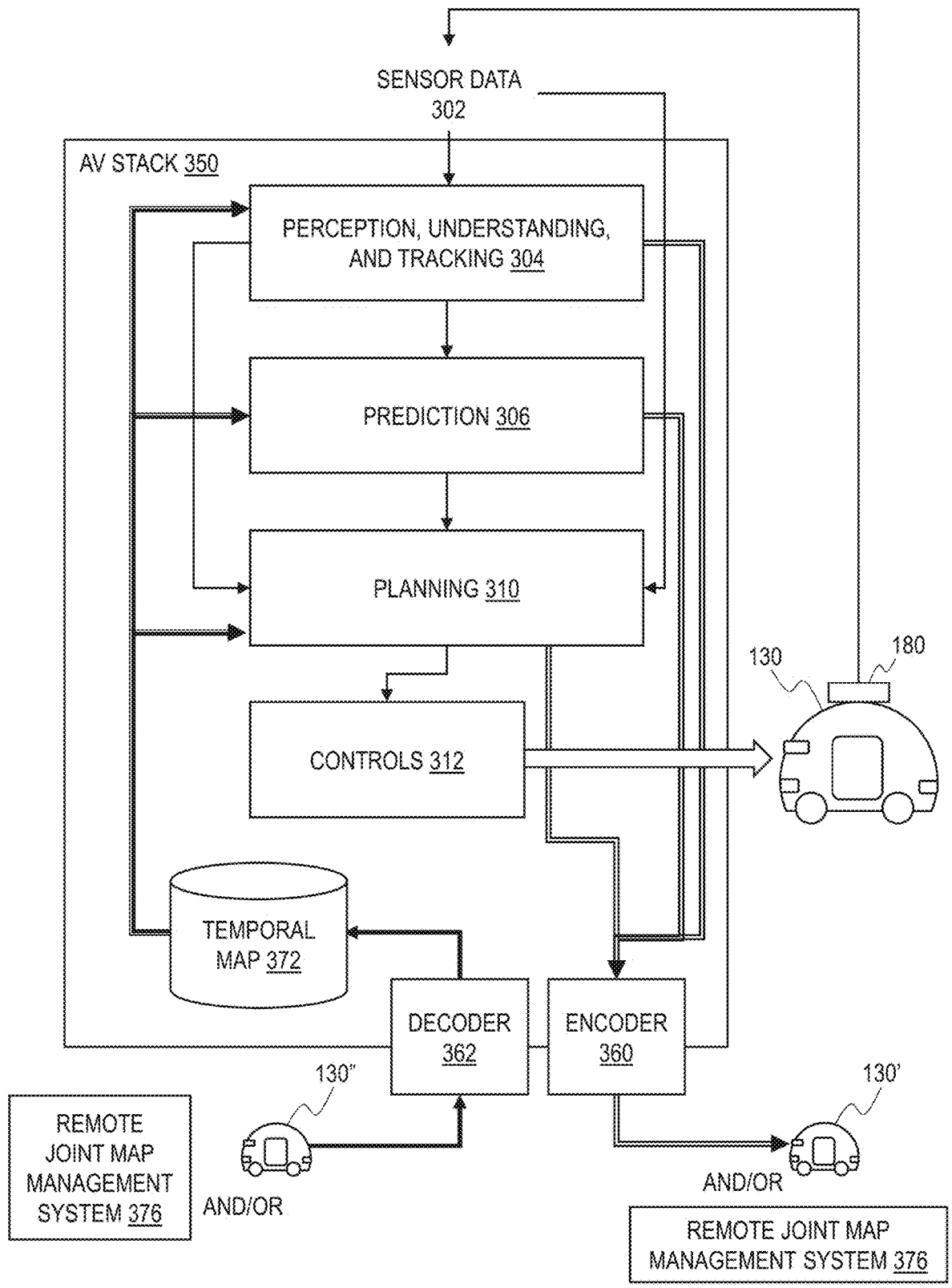
FIG. 3 illustrates an exemplary implementation of an AV stack of an AV having sensors, according to some aspects of the disclosed technology.

Object Information Determined by an AV can be Shared with Other AVs in the Fleet FIG. 3 illustrates an exemplary implementation of an AV stack 350 of an AV 130 having sensor suite 180, according to some aspects of the disclosed technology. An AV 130 may be equipped with one or more sensors, referred herein as a sensor suite 180, to sense the environment surrounding AV 130 and collect information (e.g., sensor data 302) to assist AV 130 in making driving decisions. The sensor suite 180 may include, e.g., sensor systems 1004, 1006, and 1008 of FIG. 10. The sensor suite 180 may sense an area surrounding AV 130.

The AV stack 350 may include perception, understanding, and tracking part 304, prediction part 306, planning part 310, and controls part 312. The sensor data 302 may be processed and analyzed by perception, understanding, and tracking part 304 to detect and track objects in the environment of the AV and determine an understanding of objects in the environment of the AV 130. Perception, understanding, and tracking part 304 may include one or more of: a perception part, an understanding part, and a tracking part. In some cases, a perception part/component of perception, understanding, and tracking part 304 may perceive the area surrounding AV 130 by analyzing sensor data and detecting objects that are present in the sensor data. In some cases, understanding part of perception, understanding, and tracking part 304 may classify detected objects and/or determine attributes of detected objects. In some cases, tracking part 304 may maintain a database of tracked objects at different time instants or across frames, including the location coordinates of the tracked objects. Tracking part of perception, understanding, and tracking part 304 may maintain a map of tracked objects for a current time or current frame. Tracking part of perception, understanding, and tracking part 304 may maintain a temporal map (e.g., having a series of maps of tracked objects) about tracked objects at different time instants or across frames.

Prediction part 306 may determine future motions and behaviors of the AV and/or detected and tracked objects in the environment of the AV 130. Prediction part 306 may determine and utilize motion models to track and predict kinematic and/or behaviors of detected objects.

The AV 130 may localize itself based on location information (e.g., from location sensors) and the map information. The planning part 310 may create (collision-free) planned paths or trajectories based on one or more of: information from perception, understanding, and tracking part 304, information from prediction part 306, the sensor data 302, map information, localization information, etc.

Subsequently, planned paths or trajectories can be provided to controls part 312 to generate vehicle control commands to control the AV 130 (e.g., for steering, accelerating, decelerating, braking, turning on vehicle signal lights, open doors, etc.) according to the planned path. Vehicle control commands may be sent to vehicle controls and/or mechanical systems of AV 130, e.g., vehicle propulsion system 1030, braking system 1032, steering system 1034, safety system 1036, and cabin system 1038 of FIG. 10. Vehicle control commands may cause AV 130 to navigate on the roadways.

The operations of components of the AV stack 350 may be implemented using a combination of hardware and software components. For instance, an AV stack 350 performing the perception, understanding, prediction, planning, and control functionalities may be implemented as software code or firmware code encoded in non-transitory computer-readable medium. The code for AV stack 350 may be executed on one or more processor(s) (e.g., general processors, central processors (CPUs), graphical processors (GPUs), digital signal processors (DSPs), ASIC, etc.) and/or any other hardware processing components on the AV. Additionally, the AV stack 350 may communicate with various hardware components (e.g., on-board sensors and control system of the AV) and/or with an AV infrastructure over a network. At least a part of the AV stack 350 may be implemented on local compute system 1010 of FIG. 10. At least a part of the AV stack 350 may be implemented on the computing system 1100 of FIG. 11 and/or encoded in instructions of storage device 1130 of FIG. 11.

The AV stack 350 may receive sensor data 302 from the sensor suite 180 of AV 130. Sensor data 302 may include camera sensor data (e.g., images and/or videos). Sensor data 302 may include range detection sensor data (e.g., light detection and ranging (LIDAR) sensor data, radio detection and ranging (RADAR) sensor data, time-of-flight sensor data, etc.). Sensor data 302 may include ultrasonics sensor data. Sensor data 302 may include audio data. The sensor data 302 may include fused sensor data (e.g., data fused from multiple modalities).

Perception, understanding, and tracking part 304 may detect an object in the environment of AV 130 based on sensor data 302. One or more parts of perception, understanding, and tracking part 304 may determine object information about the detected object. Object information can include rich information about the object that AV 130 has determined using AV stack 350 and sensor data 302. The rich information can assist another AV, e.g., AV 130', to better perform or improve performance of: perception of the area, understanding of the objects, tracking objects, prediction of objects, and/or path planning in the area. The object information may be determined using, e.g., digital signal processing, computer vision, machine learning models, statistical inference, etc. Object information may be derived from, or predicted from, inferences or other information determined in perception, understanding, and tracking part 304. In some cases, the object information may include rich information about the detected object, as determined by perception, understanding, and tracking part 304 and/or prediction part 306 of the AV stack 350. Object information may include intermediate outputs and/or final outputs produced by parts of the AV stack 350.

In some cases, the object information includes location coordinates of the detected object. Location coordinates may include coordinates in three-dimensional space. Perception part/component/portion of perception, understanding, and tracking part 304 can determine and/or predict the location coordinates of the detected object.

The object information may include a motion model representing expected kinematics of the detected object. Prediction part 306 may determine the motion model. Depending on the classification(s) and/or attribute(s) of the detected object (as determined by perception, understanding, and tracking part 304), and/or past location coordinates of the detected object (as tracked by perception, understanding, and tracking part 304), prediction part 306 may determine a motion model that corresponds to the detected object. A motion model may include a speed/velocity of the detected object or expected speed/velocity of the detected object. A motion model may include an acceleration of the detected object or expected acceleration of the detected object. A motion model may include a direction of travel of the detected object or expected direction of travel of the detected object. A motion model may include a current or past movement trajectory of the detected object or one or more expected movement trajectories of the detected object. A motion model may model kinematics (e.g., how an object is expected to move) that are associated with or correspond to a certain type of object, e.g., a four-wheeled vehicle, a linked bus, a two-wheeled vehicle, a pedestrian, flying debris, etc.

The object information may include a bounding box representing dimensions of, size of, boundaries of, or space occupied by the detected object. In some cases, a different three-dimensional shape may be used instead of a bounding box to represent dimensions of, size of, boundaries of, or space occupied by the detected object. Perception, understanding, and tracking part 304 may determine the bounding box. The bounding box may include a box defined in three-dimensional space. The bounding box may include x, y, z coordinates, width length, height length, and depth length. The bounding box may include four (4) x, y, z coordinates defining a face of the box, and a depth length. The bounding box may include eight (8) x, y, z coordinates defining the eight corners of the box. Coordinates used in specifying the bounding box or other suitable shape may be translated from a local reference frame of AV 130 to a common reference frame shared by the fleet of vehicles.

The object information may include object class information of the detected object. The perception, understanding, and tracking part 304 may have a machine learning model, such as a road object classifier, to determine the object class information. Object class information may include a coarse grained classification of the detected object (e.g., vehicle, autonomous vehicle, pedestrian, bicycle, unknown, etc.). Object class information may include a fine grained classification (e.g., type of emergency vehicle, whether the vehicle is a school bus, type of emergency personnel, etc.). The object information may include attribute information of the detected object. Perception, understanding, and tracking part 304 may extract attribute(s) about the detected object (e.g., whether vehicle door is open, state of vehicle signal lights, whether the debris is drivable, whether the animal can fly, whether the emergency personnel is holding a sign, whether the emergency personnel is performing a hand signal to direct traffic, etc.). Object information may include relationship(s) the detected object may have with other objects in the area. The perception, understanding, and tracking part 304 may extract relationship(s) that the detected object may have with other objects in the area.

The object information may include one or more confidence scores associated with the object information. Some object information may be inferred or estimated, and the object information may have uncertainty. Some object information may have probabilities associated with the information (e.g., representing how likely the object information represents the truth, representing how likely the object information is correct).

The object information may include a tracking age associated with the object information. Tracking age may measure how long an object has been tracked (or how many frames an object has been present) in perception, understanding, and tracking part 304. Tracking age may be used by one or more models to determine uncertainty and/or confidence score. A higher tracking age (e.g., indicating an object has been tracked for a long time) may induce a higher confidence score.

The object information may include an expiration time associated with the object information. Object information may become stale or may not be relied upon after a period of time. Depending on the type of object information, the object information may have different expiration times. Expiration time can depend on one or more factors, such as object class information, object attribute information, how fast the object is moving (e.g., speed, velocity, acceleration, etc.), confidence score, number of detected objects in the area, how congested the area is, etc. Expiration time of object information may cause another AV receiving the object information (e.g., AV 130') to discard the information when the object information expires. In some cases, the object information may expire slowly by decreasing the confidence score over time until the confidence score reaches zero when the object information fully expires. Gradual expiration of object information may cause another AV receiving the object information (e.g., AV 130') to rely on the information less and less as the object information reaches full expiration.

To prepare the information to be shared with other AVs in a fleet of AVs, the location coordinates of the detected object may be translated from a local reference frame of AV 130 to a common reference frame shared by the fleet of vehicles. The local reference frame of the AV 130 may have the location of the AV 130 as the origin of the local reference frame. The common reference frame shared by the fleet may have an origin of the common reference frame located elsewhere (e.g., a center point of a city, a landmark of the city, a border of a subdivision, etc.). The translation may enable other AVs to make use of the location coordinates of the detected object. Translation between local reference frames and common reference frames may include adding and/or subtracting one or more offsets based on the differences in the origins of the reference frames.

It may be desirable to compress sensor data associated with the object or sensor data of environment surrounding AV 130 so that the sensor data may be shared efficiently with other AVs (e.g., AV 130'), and so that the compressed information may be ingested readily in machine learning models of the other AVs. In some cases, AV 130 may compress, using an encoder 360, the sensor data corresponding to the detected object (e.g., data in multiple dimensions) into an array, such as an array of feature embeddings or a vector having feature embedding values. Encoder 360 can extract features from the sensor data corresponding to the detected object (e.g., cropped sensor data). Encoder 360 can compress the sensor data, which may include sensor data from one or more sensor modalities, and may have multiple dimensions into lower-dimensional data, such as an array. The array can include embeddings capturing salient features of the detected object. The array can be ingested readily by machine learning models in another AV, such as AV 130'. In some cases, encoder 360 can compress fused camera image sensor data and point clouds from detection and range sensors corresponding to the detected object (e.g., cropped sensor data) into a reduced size array.

Encoder 360 may already be included within AV stack 350. Encoder 360 may be a part of the perception part of perception, understanding, and tracking part 304. Encoder 360 may be a part of the understanding part of perception, understanding, and tracking part 304. Encoder 360 may be included to perform compression of intermediate outputs and/or final outputs of perception, understanding, and tracking part 304. Encoder 360 may include one or more machine learning models, such as a neural network based machine learning model, and/or a transformer based machine learning model. Encoder 360 may receive sensor data corresponding to the detected object as input (e.g., single modality sensor data or multi-modal sensor data), process the sensor data through one or more layers of nodes, and generate the array at an output layer of nodes. Weights or matrices in the nodes used in processing the sensor data may be trained to optimize for a certain loss function.

AV 130 can transmit the object information, the array (from encoder 360), and a timestamp associated with the object information and the array to the further vehicle (e.g., AV 130') which does not have the object within a field of perceivable area of one or more sensors of the further vehicle. AV 130 can transmit the object information, the array (from encoder 360), and a timestamp associated with the object information and the array to a remote joint map management system 376.

The timestamp can date the object information and the array (e.g., indicating a time that sensor data used to generate the object information and the array is captured by the sensor suite 180). The timestamp can help the further vehicle, e.g., AV 130', decide whether to rely on the object information and the array even if the object information and the array is dated in the past. Object information and the array, even if from the past (e.g., 200 ms) may still be helpful for AV 130' to decrease uncertainty of understanding of the area. Timestamp may help the further vehicle, e.g., AV 130', project or predict an object trajectory in accordance with the motion model provided in the object information, which can impact how AV 130' plans a collision-free path.

AV 130 may transfer information about various objects detected by AV 130. AV 130 may transfer information about AV 130 as well. AV 130 may transfer information directly to AV 130'. AV may transfer information to remote joint map management system 376.

Information about AV 130 may include location coordinates of AV 130, bounding box of AV 130, planned trajectory of AV 130, motion model of AV 130, object class information of AV 130, object attribute information of AV 130, an array of feature embeddings of AV 130 (which may be generated by a simulation of AV 130), etc.

AV 130 may transmit and/or transfer object information about various objects detected by AV 130 to AV 130'. AV 130 may transmit and/or transfer object information about various objects detected by AV 130 to a remote joint map management system 376. AV 130 may transmit, share, and/or transfer object information about various objects to a system that is external to or remote from AV 130. Remote joint map management system 376 may collect object information detected by one or more AVs in the fleet (e.g., AV 130). One or more AVs in the fleet may query remote joint map management system 376 for information about objects in a certain area of interest. Remote joint map management system 376 may transmit the object information to one or more AVs in the fleet, e.g., in response to the query.

Ingesting Information in the AV Stack about Objects Detected by Another AV

Data generated by AV 130 of FIG. 3 about objects detected by AV 130 and optionally information about AV 130 can be transferred and/or sent to another AV in the fleet, such as AV 130', and/or to a remote joint map management system 376. AV 130 may receive information from another AV in the fleet, such as AV 130". AV 130 may receive information from remote joint map management system 376, which collects information from one or more AVs in the fleet. The fleet may include one or more of: AV 130, AV 130', and AV 130". AV 130 may query remote joint map management system 376 for information about objects in a particular area of interest.

AV 130 can incorporate the received information (e.g., location coordinates, dimensions, object class information, motion model, confidence score) into one or more of perception, understanding, and tracking part 304, prediction part 306, and planning part 310. In some cases, the received information can be used to increase an attention of a machine learning model in perception, understanding, and tracking part 304 in a specific area (e.g., area where an object is outside the observable or perceivable area). In some cases, the received information may be used to track objects even if the detected object corresponding to the received information is outside the observable or perceivable area of the one or more sensors of AV 130. Further details for how the received information can be used by AV 130 are described below.

Continuing to refer to FIG. 3, AV 130 may receive from a further vehicle within the area (e.g., AV 130"), and/or from remote joint map management system 376, object information corresponding to an object in the area, an array of feature embeddings corresponding to the object, and a timestamp associated with the object information and the array. The object information may include a variety of information about the object that AV 130" has determined (similar to how AV 130 can determine information about objects in the area). For AV 130, the object may not be within an observable or perceivable area of one or more sensors in the sensor suite 180 of AV 130 (examples of such scenarios are described in FIGS. 1-2).

Figure 5:
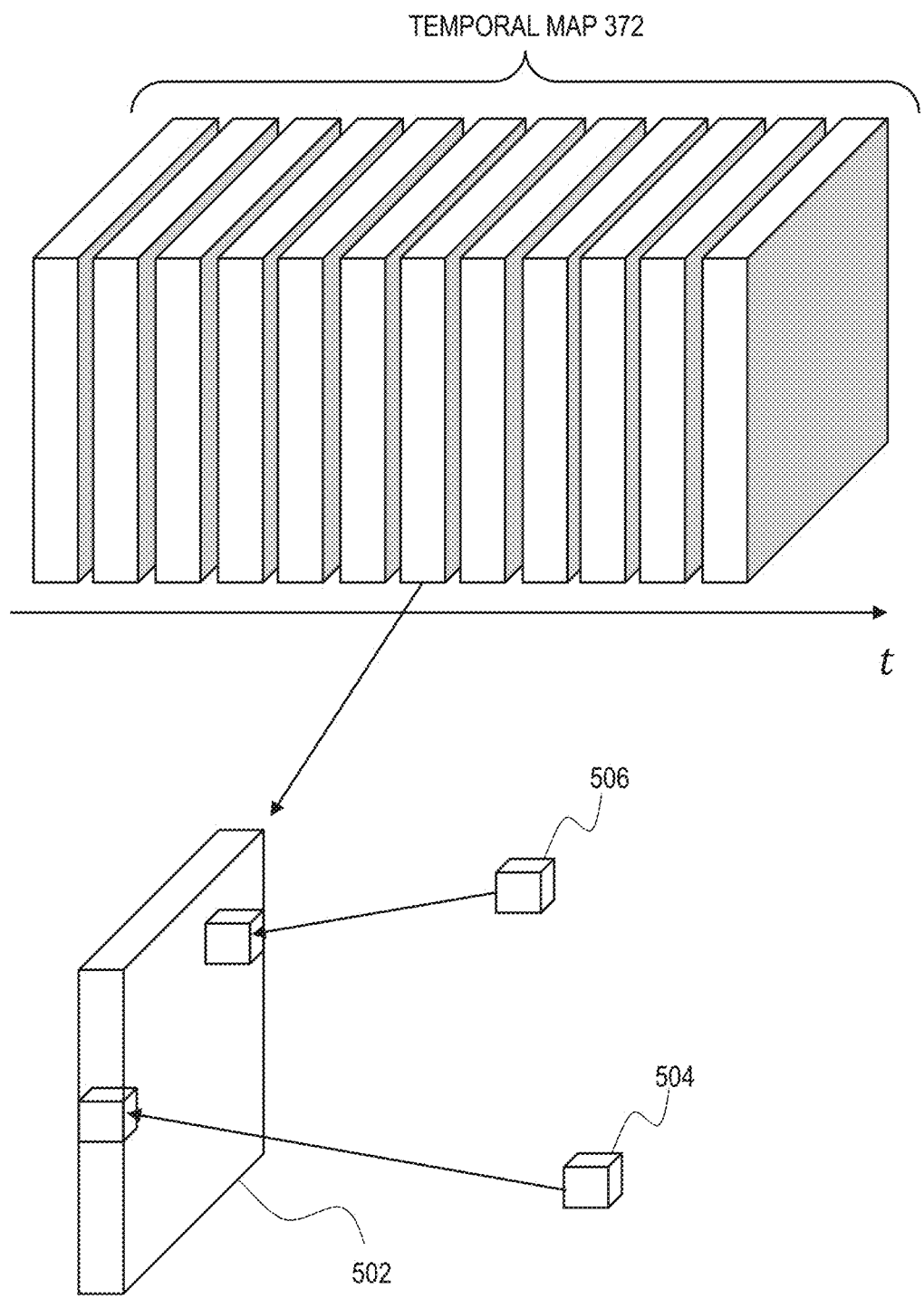
FIG. 5 illustrates an exemplary temporal map, according to some aspects of the disclosed technology.

AV 130 may incorporate the object information, the array, and the timestamp to a temporal map 372 of the area. Temporal map 372 may store information about objects in the area surrounding AV 130 for a certain period of time or may store a certain amount of historical information about objects in the area surrounding AV 130. Temporal map 372 may include timestamped data about objects in the area corresponding to a period of time in the past. In some cases, temporal map 372 may store data about objects in the area projected into the future corresponding to a period of time in the future. The period of time may change depending on a speed of AV 130. In some cases, the period of time may be shorter as AV 130 moves faster, so that historical information about objects in the area is discarded more quickly. An illustration of temporal map 372 is shown in FIG. 5. Temporal map 372 may be stored in a first-in-first-out data structure. Temporal map 372 may store information over many ticks, or over a period of time.

In some cases, AV 130 may apply one or more rules to discard received information from another AV, such as AV 130". For example, AV 130 may incorporate or add one or more of the object information and the array if a difference between a current time/timestamp and the timestamp associated with the object information and the array does not exceed a threshold. AV 130 may discard one or more of the object information and the array if the difference exceeds the threshold. The threshold may depend on one or more factors, such as the object class information in the received information having a certain object class, a speed/velocity of the object in the object information crossing a threshold, confidence score in the object information being lower than a threshold, a level of congestion near AV 130 crossing a threshold, etc. In another example, AV 130 may discard received information if the information meets one or more criteria. Examples of criteria may include object class information indicating that AV 130 cannot use the received information or that AV 130 will not benefit from the received information, object class information in the received information having a certain object class, a speed/velocity of the object in the object information crossing a threshold, confidence score in the object information being lower than a threshold, a level of congestion near AV 130 crossing a threshold, location coordinates indicates that the object is outside an area of interest for AV 130 (e.g., behind AV 130, too far away from AV 130), etc.

The information (e.g., one or more of the received object information and the received array) being added to temporal map 372 may be flagged as transferred information, meaning that AV 130 did not determine the information, and that the information is transferred from another AV, such as AV 130", and/or from remote joint map management system 376. Parts in AV stack 350 may process the object information flagged as transferred information differently from object information that AV 130 has self-determined.

AV 130 may receive information about objects within a certain area near AV 130". AV 130 may receive information about AV 130" as well. The area may be defined based on a radius (e.g., 100 m, 200 m, etc.) from the location of AV 130". Not all objects that AV 130" is reporting are within the observable or perceivable area of sensor suite 180 of AV 130. Some objects that AV 130" is reporting may be outside the observable or perceivable area of sensor suite 180. AV 130 may determine from the object information that the object is not within an observable or perceivable area of one or more sensors of sensor suite 180 of AV 130. AV 130 may check whether the object information represents an object that is already tracked by AV 130 or already seen by AV 130. If the object is not already tracked by AV 130, AV 130 may determine that the object is likely to be occluded. Accordingly, AV 130 may flag one or more of the object information and the array in the temporal map 372 as occluded object information or object information of an object that is not within an observable or perceivable area of one or more sensors of sensor suite 180 of AV 130. Parts in AV stack 350 may process the object information flagged as occluded object information differently from object information corresponding to objects that are within the observable or perceivable area of one or more sensors of sensor suite 180 of AV 130.

AV 130 may query remote joint map management system 376 and receive information about objects within an area of interest of AV 130 (e.g., an area surrounding AV 130). In some cases, objects may include one or more AVs in the fleet within the area of interest (e.g., AV 130"). The area of interest may be defined based on a radius (e.g., 100 m, 200 m, etc.) from the location of AV 130. Not all objects in the area of interest of AV 130 may be within the observable or perceivable area of the sensor suite 180 of AV 130. Some objects in the area of interest of AV 130 may be outside the observable or perceivable area of sensor suite 180. AV 130 may determine from the received object information that the object is not within an observable or perceivable area of one or more sensors of sensor suite 180 of AV 130. AV 130 may check whether the object information represents an object that is already tracked by AV 130 or already seen by AV 130. If the object is not already tracked by AV 130, AV 130 may determine that the object is likely to be occluded. Accordingly, AV 130 may flag one or more of the object information and the array in the temporal map 372 as occluded object information or object information of an object that is not within an observable or perceivable area of one or more sensors of sensor suite 180 of AV 130. Parts in AV stack 350 may process the object information flagged as occluded object information differently from object information corresponding to objects that are within the observable or perceivable area of one or more sensors of sensor suite 180 of AV 130.

AV 130 may perform one or more functionalities illustrated in AV stack 350 using the temporal map 372 of the area. For example, AV 130 may use the received information stored in temporal map 372 to perform perception of objects in the area. AV 130 may use the received information stored in temporal map 372 to perform understanding of objects in the area. AV 130 may use the received information stored in temporal map 372 to perform tracking of objects in the area. AV 130 may use the received information stored in temporal map 372 to perform prediction of objects in the area. AV 130 may use the received information stored in temporal map 372 to perform path planning of AV 130. Exemplary ways the received information in temporal map 372 is used are further illustrated with FIG. 4.

In some embodiments, the received information, e.g., location coordinates, and specification of a bounding box, may be based on a common reference frame shared by the fleet of vehicles. Processes in AV stack 350 may operate using a local reference frame of AV 130. AV 130 may translate the received information from the common reference frame to the local reference frame used by AV 130.

The information in the array of feature embeddings may be used directly in one or more processes in AV stack 350. In some cases, the array may be decoded by decoder 362. Decoder 362 may expand or decompress the information back into sensor data corresponding to the object. The decoded information may be used to track and/or associate the object in later frames of sensor data. In some cases, the decoder 362 may already be a part of AV stack 350. Decoder 362 may be a part of the perception part of perception, understanding, and tracking part 304. Decoder 362 may be a part of the understanding part of perception, understanding, and tracking part 304. Decoder 362 may be included to perform expansion or decompression of intermediate outputs of perception, understanding, and tracking part 304. Decoder 362 may include one or more machine learning models, such as a neural network based machine learning model, and/or a transformer based machine learning model. Decoder 362 may receive the array as input, process the array through one or more layers of nodes, and generate a higher dimensionality data, e.g., the sensor data corresponding to the detected object (e.g., single modality sensor data or multi-modal sensor data) at an output layer of nodes. Weights or matrices in the nodes used in processing the array may be trained to optimize for a certain loss function. Decoder 362 may mirror the structure of encoder 360 to perform a reverse function, inverse operation, or inverting transformation.

Figure 4:
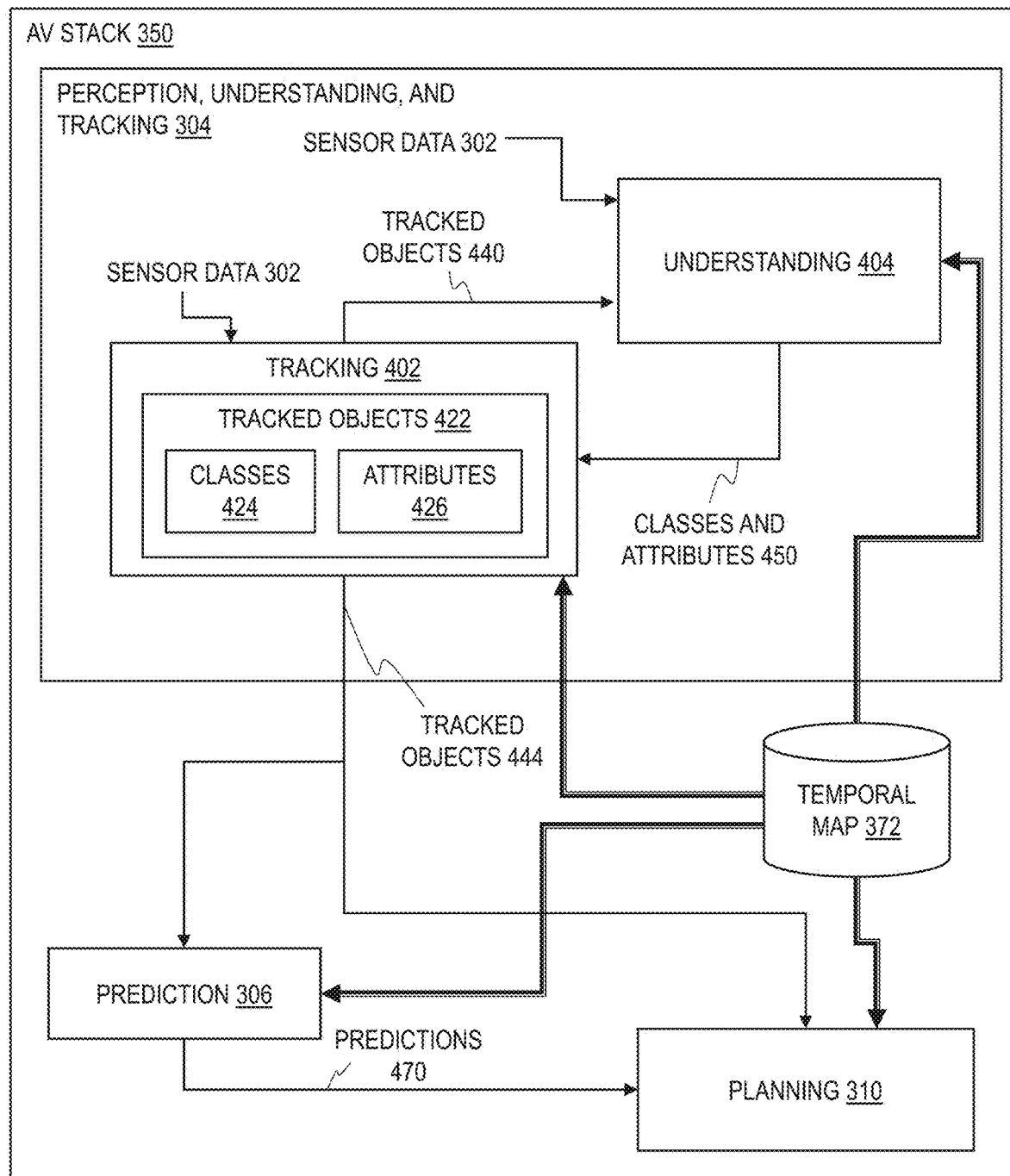
FIG. 4 illustrates an exemplary implementation of an AV stack, according to some aspects of the disclosed technology.

[Some of this content came from a different patent application I wrote for Cruise to show an example architecture for how the AV stack can be implemented. I am using it as a basis for showing how the temporal map 372 (or joint map) can be ingested and used by different parts of the stack] FIG. 4 illustrates an exemplary implementation of an AV stack 350, according to some aspects of the disclosed technology. As illustrated, AV stack 350 includes perception, understanding, and tracking part 304, prediction part 306, and planning part 310. The figure illustrates one exemplary configuration and arrangement of parts within an AV stack and is not intended to be limiting to the disclosure. Received information from one or more other AVs in the area are incorporated into temporal map 372. The received information may include object information about an object (detected by a further AV), and an array of feature embeddings of the detected object. One or more parts of the received information may be used by various components of AV stack 350 to improve the operations of the AV stack 350.

Perception, understanding, and tracking part 304 may include tracking part 402 and understanding part 404. Tracking part 402 may receive sensor data 302 from a sensor suite of an AV (the sensor suite may include, e.g., sensor systems 1004, 1006, and 1008 of FIG. 10). Tracking part 402 may determine from the sensor data 302 presence of objects in an environment of the AV and track the objects presence over time (or across frames of data). Tracking part 402 may maintain tracked objects 422 (organized in a suitable data structure that tracks presence and location of unique objects over time or across frames). The presence of an object can be encoded as a bounding box defining boundaries and location coordinates of an object in a three-dimensional space. The presence of an object can be encoded as location coordinates and size information that specify the object's occupancy in space.

Understanding part 404 may receive sensor data 302 and optionally tracked objects information 440 (relating to tracked objects 422) to understand the objects in the environment of the AV. The received array of feature embeddings may be used in understanding part 404 to perceive and/or to understand the detected object. The array of feature embeddings may be used by understanding part 404 to make inferences such as classes and attributes of the object. In some cases, the decoded array (e.g., the received array decoded by a decoder) may be used as part of sensor data 302 that is processed by understanding part 404 to track (or perceive or locate) the object in future frames of sensor data. Understanding part 404 may process sensor data 302, e.g., using one or more machine learning models, to produce inferences about the tracked objects 422, such as one or more classes and/or one or more attributes for tracked objects 422. Understanding part 404 may provide classes and attributes 450 as feedback information to tracking part 402. Directly or indirectly, classes and attributes 450 produced by understanding part 404 may be provided to prediction part 306 and/or planning part 310 to assist prediction and/or planning functionalities respectively. The received object information may include object class information and/or object attribute information of the detected object. Understanding part 404 may use the object class information and/or object attribute information directly and include the object class information and/or object attribute information in classes and attributes 450. The object class information and/or object attribute information may be flagged as transferred or occluded. The object class information and/or object attribute information may be used to better understand objects in the area.

As illustrated in the figure, tracking part 402 may serve as a classes and attributes collector and can collect and maintain classes 424 and/or attributes 426 for tracked objects 422. The objects and information associated with the objects may be maintained as tracked objects 422 in tracking part 402. Tracked objects 422 may be in a format of a database or collection of data that includes data entries for tracked objects 422, where each data entry for a tracked object may include information for the tracked object, such as an object identifier of the tracked object, bounding box of the tracked object, one or more classifications of the tracked object (object class information), and one or more attributes of the tracked object (object attribute information). Tracked objects 422 may be organized in a map format, e.g., such as a grid map or raster map of an environment surrounding the AV, whose pixels may store information for various tracked objects, such as an object identifier of the tracked object, bounding box of the tracked object, one or more classifications of the tracked object, and one or more attributes of the tracked object. The received object information may include a bounding box representing dimensions or size of the detected object. The bounding box may be stored directly as part of tracked objects 422 to use the bounding box to track objects in the area. The bounding box may be flagged as transferred and/or occluded. The received object information may include a tracking age associated with the object information. The tracking age may be used in tracking part 402. Tracking age may indicate when or whether tracking part 402 should expect the object to be seen/perceived by understanding part 404 in future frames.

Perception, understanding, and tracking part 304 may provide tracked objects information 444 (of tracked objects 422) to prediction part 306. Perception, understanding, and tracking part 304 may provide tracked objects information 444 (of tracked objects 422) to planning part 310. Prediction part 306 may provide predictions 470 to planning part 310. Tracked objects information 440 and/or tracked objects information 444 may include at least some of the information maintained in tracked objects 422. Tracked objects information 444 provided from tracking part 402 to prediction part 306 and planning part 310 may include information produced by tracking part 402 and information produced by understanding part 404. The received object information may include a motion model representing expected kinematics of the detected object. Prediction part 306 may use the motion model to predict motion of the detected object and output the prediction motions as part of prediction 470. Planning part 310 may use the motion model or predictions 470 generated by prediction part 306 from the motion model to plan a collision-free path. The received object information may include a tracking age associated with the object information. The tracking age may be used in prediction part 306 and/or planning part 310. Tracking age may indicate where the detected object may be located or is expected to be located in future frames.

The received object information may include location coordinates of an object that is outside of the observable or perceivable area of the AV. The location coordinates may be used to increase attention or change an attention of one or more parts of the AV stack 350. In some cases, the one or more parts of the AV stack 350 may use an attention-based (e.g., transformer) model, and the attention matrices having weights assigned to different regions may be adjusted based on the location coordinates so as to increase attention in the area near the object. In some cases, the location coordinates may impact whether sensor fusion is to be performed for the area near the object to increase accuracy of prediction/inferences being made by the one or more parts of the AV stack. In some cases, the location coordinates may increase the resolution or content of the sensor data in the area near the object being used as input to the one or more or parts of the AV stack. In some cases, the location coordinates may cause one or more additional models to be applied or activated to process the sensor data in the area near the object to derive object class information and/or object attribute information that may be particularly pertinent to occluded objects (e.g., apply a model to determine whether a car door is open).

The received object information may include one or more confidence scores associated with the object information. Different parts of the AV stack 350 may use the confidence score(s) to determine whether to or the extent to which the part should rely on the object information. Object information with a high confidence score may be weighted higher relative to object information with a low confidence score. Object information with a low confidence score (lower than a threshold) may be discarded or ignored. Object information with a lower confidence score may yield inferences made by one or more parts of the AV stack 350 using said object information to have a lower confidence or a greater amount of uncertainty.

The received object information may include an expiration time associated with the object information. Different parts of the AV stack 350 may use the expiration time to determine whether to or the extent to which the part should rely on the object information. Object information having an expiration time in the past may be discarded completely. Object information having an expiration time that is soon approaching may be relied upon in a lesser extent.

Temporal Map Having Joint Information from the AV and a Further AV

FIG. 5 illustrates an exemplary temporal map 372, e.g., maintained by an AV, according to some aspects of the disclosed technology. Temporal map 372 may store map slices across a period of time or over many frames/ticks. Timestamp associated with received object information and the received array may be used to incorporate the received object information and the received array into one or more slices of temporal map 372. An exemplary map slice is shown as map slice 502. In map slice 502, cell 504 may include received object information of a detected object from a further AV (the detected object may be outside the observable or perceivable area of the AV). Cell 504 may include an array of feature embeddings generated from sensor data corresponding to the detected object. Cell 504 may include the array decoded by a decoder. Cell 504 may be flagged as transferred and/or occluded. In map slice 502, cell 506 may include object information of an object (locally) detected by the AV (the detected object may be inside or within the observable or perceivable area of the AV). Cell 506 may include an array of feature embeddings of the object (locally) detected by the AV. Cell 506 may include sensor data corresponding to the object (locally) detected by the AV.

Figure 7:
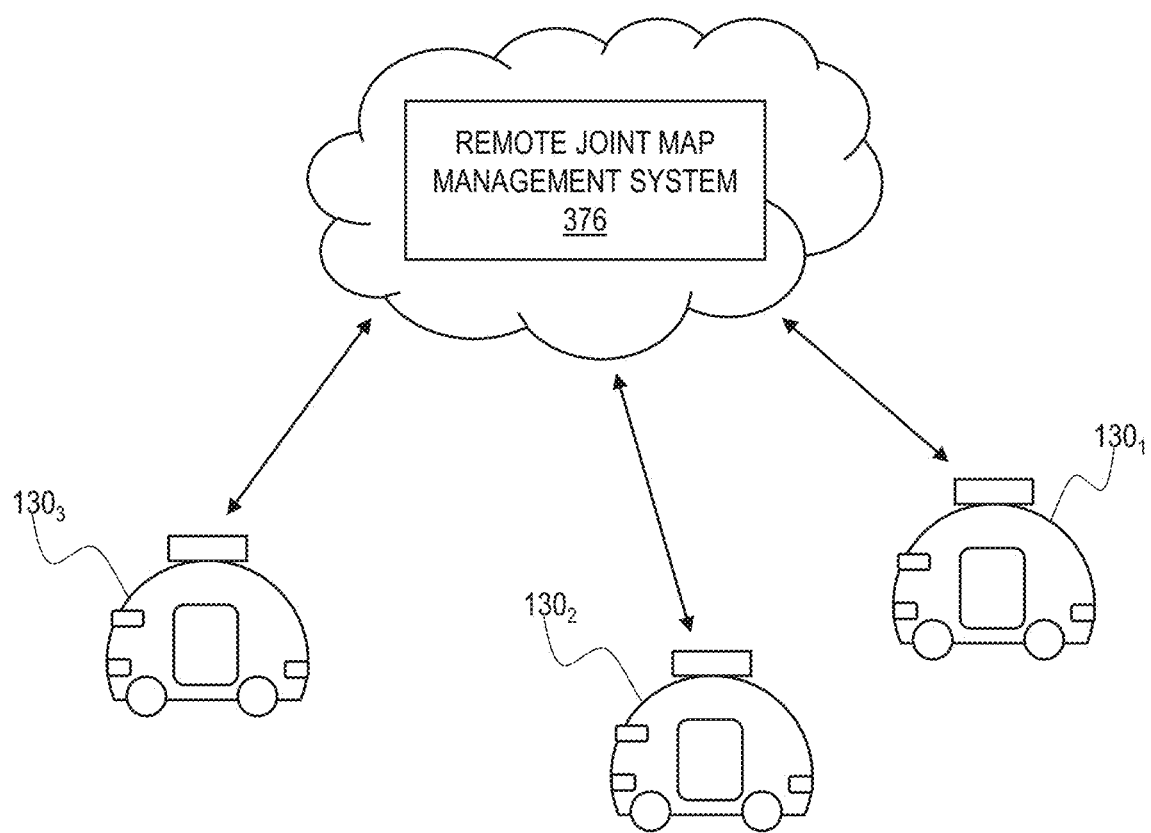
FIG. 7 illustrates communications between different vehicles in an area via remote joint map management system, according to some aspects of the disclosed technology.

In some embodiments, remote joint map management system 376 as seen in FIGS. 3 and 7 may collect information about objects detected by one or more AVs in a fleet. Remote joint map management system 376 may store and/or maintain the collected information in a temporal map 372. Remote joint map management system 376 may store information about objects within a region and/or locale. Remote joint map management system 376 may store a fixed number of map slices across a predetermined period of time.

Exemplary Ways to Share Information Among Vehicles in a Fleet of Vehicles

Figure 6:
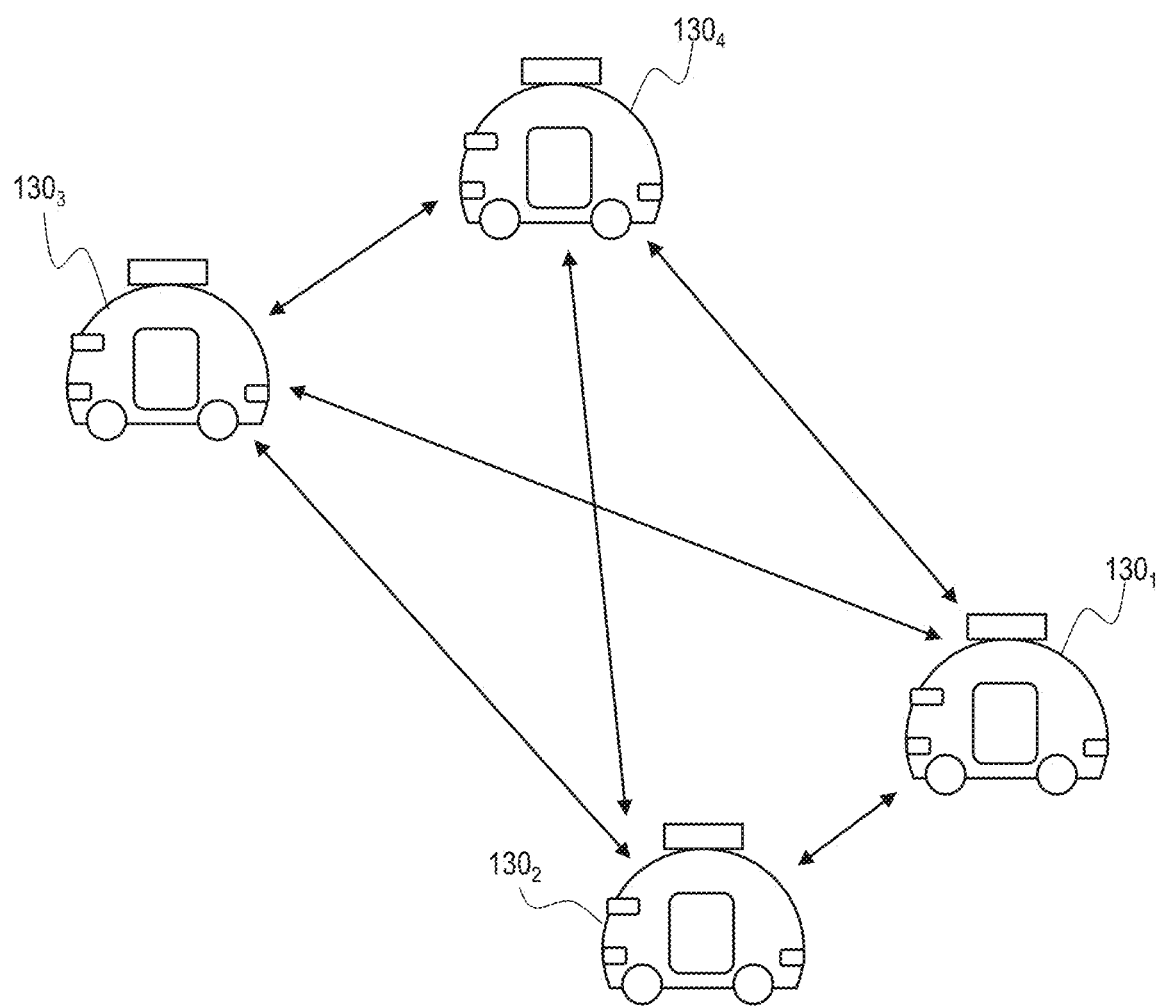
FIG. 6 illustrates vehicle to vehicle communications between different vehicles in an area, according to some aspects of the disclosed technology.

FIG. 6 illustrates vehicle to vehicle communications between different vehicles in an area, according to some aspects of the disclosed technology. AV $130_1$, AV $130_2$, AV $130_3$, and AV $130_4$ may be part of a fleet of AVs. The AVs may share information with each other, and may communicate with each other via a vehicle to vehicle communication protocol (e.g., near field communications, radio frequency communications, etc.). In some cases, an AV may broadcast object information and an array (and the timestamp) for respective objects within a radius of the AV to any AV in the fleet that may be listening for the information. In some cases, an AV may receive a request to share information with another AV in the fleet, and in response, the AV may transfer, transmit, or provide the information for respective objects within a radius of the AV. The radius may be specified by the AV that is requesting the information. The radius may depend on one or more factors (e.g., speed/velocity of the AV that is requesting the information, level of congestion in the area, type of maneuver the AV is performing, etc.). In some cases, an AV may broadcast or transmit a request for object information to other vehicles in the fleet of vehicles located in the area (e.g., an area of interest as discussed with FIGS. 1-2). The area of interest may be based on a distance or radius from the AV. The distance or radius may change based on one or more factors, e.g., a speed/velocity of the AV, level of congestion in the vicinity of the AV, whether the AV is approaching an intersection, whether the AV is approaching a blind corner or blind turn, whether the AV is expecting objects to be occluded behind a hill, etc.

FIG. 7 illustrates communications between different vehicles in an area via remote joint map management system 376, according to some aspects of the disclosed technology. AV $130_1$, AV $130_2$, and AV $130_3$, may be part of a fleet of AVs. The AVs may share information with each other via remote joint map management system 376. An AV may transmit object information and an array (and the timestamp) for respective objects within a radius of the AV to remote joint map management system 376 via long-range communication protocol (e.g., cellular network communications). Remote joint map management system 376 may collect information from various AVs in the fleet of AVs. An AV in the fleet may request or query remote joint map management system 376 for object information and an array for respective objects within an area of interest for the AV. In response to the request, the remote joint map management system 376 may transmit the object information and an array for respective objects within the area of interest to the AV. The AV may transmit a request for object information of an area of interest to the remote joint map management system 376. The AV may receive the object information and array for the respective objects within the area of interest in response to the request.

In some embodiments, remote joint map management system 376 may include distributed systems to collect information about objects detected by one or more AVs in a fleet. Each distributed system may collect information about objects located within a corresponding portion or area of a region and/or locale. Each distributed system may store a corresponding temporal map, such as temporal map 372. The portions or areas may or may not overlap with each other. A distributed implementation may offer the advantage of scalability as the size of the region and/or locale grows. An AV in a fleet may determine the appropriate distributed system to query for objects based on the location of the AV and/or the area of interest of the AV, and query the appropriate distributed system accordingly.

In some embodiments, the distributed systems may be implemented on a plurality of AVs. In some embodiments, the distributed systems may be implemented at a centralized data center. In some embodiments, the distributed systems may be implemented at multiple data centers at different locations within the region and/or locale.

Exemplary Method for Sharing Information with a Further Vehicle

Figure 8:
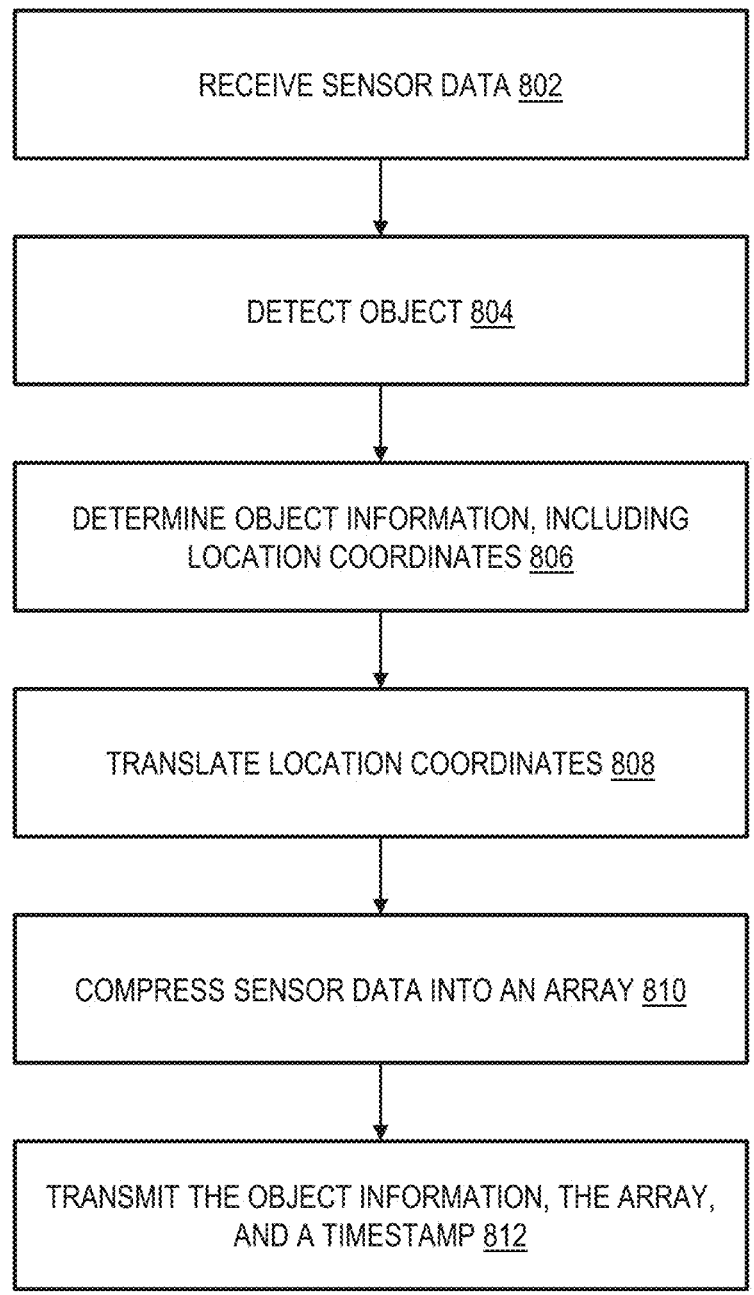
FIG. 8 shows a flow diagram illustrating a method for a vehicle to share information with a further vehicle within an area, according to some aspects of the disclosed technology.

FIG. 8 shows a flow diagram illustrating a method for a vehicle to share information with a further vehicle within an area, according to some aspects of the disclosed technology. The method may be implemented on AV 130 (e.g., in compute system 1010 of AV 130 in FIG. 10, in or with AV stack 350, etc.) as illustrated in the FIGURES. In 802, the vehicle may receive sensor data from the one or more sensors of the vehicle sensing the area. In 804, the vehicle may detect an object based on the sensor data. In 806, the vehicle may determine object information of the detected object based on the sensor data, the object information including location coordinates. In 808, the vehicle may translate the location coordinates of the detected object from a local reference frame of the vehicle to a common reference frame shared by the fleet of vehicles. In 810, the vehicle may compress, using an encoder, sensor data corresponding to the detected object into an array. In 812, the vehicle may transmit the object information, the array, and a timestamp associated with the object information and the array.

The object information, the array, and the timestamp may be receivable and/or consumable by the further vehicle which does not have the object within a field of perceivable area of one or more sensors of the further vehicle. The object information, the array, and the timestamp may be sent to and/or received by the further vehicle which does not have the object within a field of perceivable area of one or more sensors of the further vehicle. The object information, the array, and a timestamp associated with the object information and the array may be sent to the further vehicle. The object information, the array, and a timestamp associated with the object information and the array may be sent to a remote joint map management system that the further vehicle can query.

In some cases, the vehicle may transmit the object information, the array, and a timestamp associated with the object information and the array to the further vehicle. In some cases, the vehicle may cause the object information, the array, and a timestamp associated with the object information and the array to be transmitted to the further vehicle, via a remote joint map management system. In some cases, the vehicle may transmit the object information, the array, and a timestamp associated with the object information and the array to the remote joint map management system.

Exemplary Method for Receiving Information with a Further Vehicle

Figure 9:
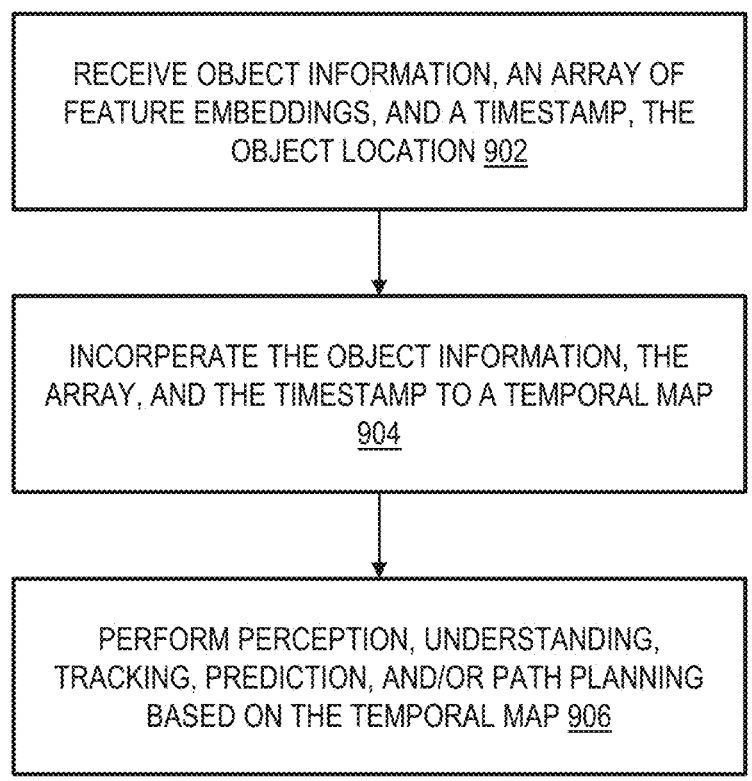
FIG. 9 shows a flow diagram illustrating a method for a vehicle to receive information from a further vehicle within an area, according to some aspects of the disclosed technology.

FIG. 9 shows a flow diagram illustrating a method for a vehicle to receive information from a further vehicle within an area (or to receive information generated by a further vehicle), according to some aspects of the disclosed technology. The method may be implemented on AV 130 (e.g., in compute system 1010 of AV 130 in FIG. 10, in or with AV stack 350, etc.) as illustrated in the FIGURES. In 902, the vehicle may receive object information corresponding to an object in the area, an array of feature embeddings corresponding to the object, and a timestamp associated with the object information and the array. The object information includes location coordinates of the object in the area, and the object is not within an observable or perceivable area of one or more sensors of the vehicle. The information may be determined or detected by the further vehicle. The information may be received from the further vehicle. The information may be received from a remote joint map management system. In 904, the vehicle may incorporate the object information, the array, and the timestamp to a temporal map of the area. In 906, the vehicle may perform one or more of: perception of objects in the area, understanding of the objects in the area, tracking of the objects in the area, prediction of the objects in the area, and path planning of the vehicle, based on the temporal map of the area.

Leveraging Information in Temporal Map Having Transferred Information in Offline Training A temporal map that combines information of locally detected objects and objects detected by other vehicles can be used offline to improve machine learning models used in the vehicles. The data that is flagged as transferred or occluded can be used in training of the machine learning models, so that the models can learn the relationship between receiving an object detected by a further vehicle that a vehicle cannot see (yet). The models can learn the influence of the transferred or occluded information on the models. For example, the machine learning models can learn how to attend to certain regions of the sensor data space (e.g., camera image space, point cloud space from LIDAR and RADAR sensor data). The machine learning models can learn to expect the transferred or occluded object even if the vehicle cannot or does not directly see the object (yet). The machine learning models can learn to operate better in the presence of transferred or occluded objects, and to take the transferred or occluded objects into account.

Exemplary AV Management System

Figure 10:
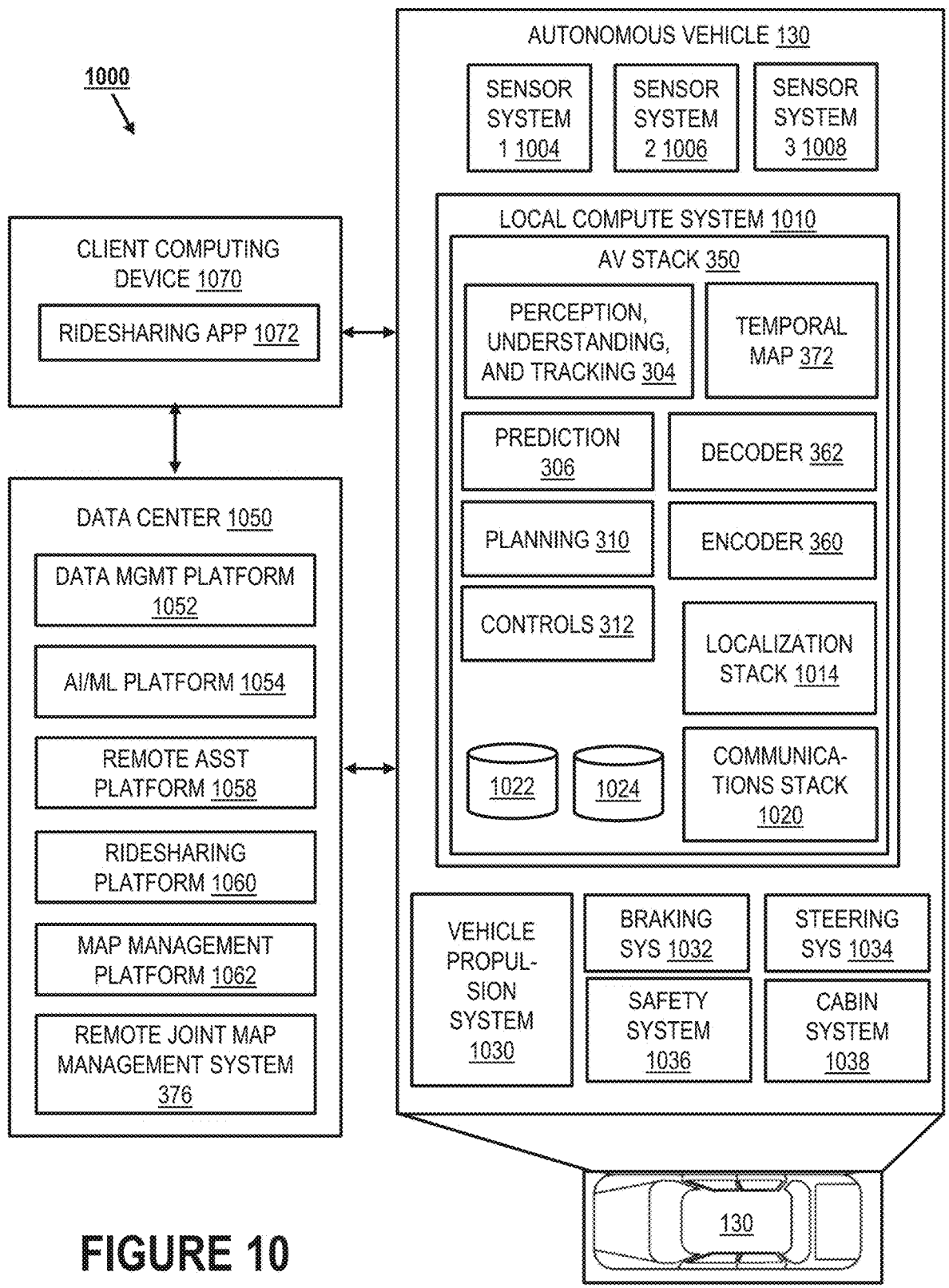
FIG. 10 illustrates an exemplary system environment that may be used to facilitate fleet AV operations, according to some aspects of the disclosed technology.

FIG. 10 illustrates an exemplary system environment that may be used to facilitate fleet AV operations, according to some aspects of the disclosed technology.

Turning now to FIG. 10, this figure illustrates an example of an AV fleet management system 1000, in which some of the aspects of the present disclosure can be implemented. One of ordinary skill in the art will understand that, for the AV fleet management system 1000 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV fleet management system 1000 includes an AV 130, a data center 1050, and a client computing device 1070. The AV 130, the data center 1050, and the client computing device 1070 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 130 may navigate about roadways without a human driver based on sensor signals generated by multiple sensor systems 1004, 1006, and 1008. The sensor systems 1004-1008 may include different types of sensors and may be arranged about the AV 130. For instance, the sensor systems 1004-1008 may comprise Inertial Measurement Units (IMUs), cameras (e.g., still image cameras, video cameras, thermal cameras, signal cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), time-of-flight sensors, structured light sensor, infrared sensors, signal light sensors, thermal imaging sensors, engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 1004 may be a camera system, the sensor system 1006 may be a LIDAR system, and the sensor system 1008 may be a RADAR system. Other embodiments may include any other number and type of sensors.

AV 130 may also include several mechanical systems that may be used to maneuver or operate AV 130. For instance, mechanical systems may include vehicle propulsion system 1030, braking system 1032, steering system 1034, safety system 1036, and cabin system 1038, among other systems. Vehicle propulsion system 1030 may include an electric motor, an internal combustion engine, or both. The braking system 1032 may include an engine brake, a wheel braking system (e.g., a disc braking system that utilizes brake pads), hydraulics, actuators, and/or any other suitable componentry configured to assist in decelerating AV 130. The steering system 1034 may include suitable componentry configured to control the direction of movement of the AV 130 during navigation. Safety system 1036 may include lights and signal indicators, a parking brake, airbags, and so forth. The cabin system 1038 may include cabin temperature control systems, in-cabin entertainment systems, and so forth. In some embodiments, the AV 130 may not include human driver actuators (e.g., steering wheel, handbrake, foot brake pedal, foot accelerator pedal, turn signal lever, window wipers, etc.) for controlling the AV 130. Instead, the cabin system 1038 may include one or more client interfaces (e.g., GUIs, Voice User Interfaces (VUIs), etc.) for controlling certain aspects of the mechanical systems 1030-1038.

AV 130 may additionally include a local compute system 1010 that is in communication with the sensor systems 1004-1008, the mechanical systems 1030-1038, the data center 1050, and the client computing device 1070, among other systems. The local compute system 1010 may include one or more processors and memory, including instructions that may be executed by the one or more processors. The instructions may make up one or more software stacks or components responsible for controlling the AV 130; communicating with the data center 1050, the client computing device 1070, and other systems; receiving inputs from riders, passengers, and other entities within the AV's environment; logging metrics collected by the sensor systems 1004-1008; and so forth. In this example, the local compute system 1010 includes AV stack 350. AV stack 350 may include a perception, understanding, and tracking part 304, a mapping and localization stack 1014, a prediction part 306, a planning part 310, and controls part 312, a communications stack 1020, an HD geospatial database 1022, and an AV operational database 1024, among other stacks and systems. AV stack 350 may include one or more of: temporal map 372, decoder 362, and encoder 360.

Perception, understanding, and tracking part 304 may enable the AV 130 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 1004-1008, the mapping and localization stack 1014, the HD geospatial database 1022, other components of the AV, and other data sources (e.g., the data center 1050, the client computing device 1070, third-party data sources, etc.). The perception, understanding, and tracking part 304 may detect and classify objects and determine their current and predicted locations, speeds, directions, and the like. In addition, the perception, understanding, and tracking part 304 may determine the free space around the AV 130 (e.g., to maintain a safe distance from other objects, change lanes, park the AV, etc.). The perception, understanding, and tracking part 304 may also identify environmental uncertainties, such as where to look for moving objects, flag areas that may be obscured or blocked from view, and so forth. Exemplary implementations of perception, understanding, and tracking part 304 are illustrated in the FIGURES.

Prediction part 306 may predict behaviors and movements of tracked objects sensed by perception, understanding, and tracking part 304.

Mapping and localization stack 1014 may determine the AV's position and orientation (pose) using different methods from multiple systems (e.g., GPS, IMUs, cameras, LIDAR, RADAR, ultrasonic sensors, the HD geospatial database 1022, etc.). For example, in some embodiments, the AV 130 may compare sensor data captured in real-time by the sensor systems 1004-1008 to data in the HD geospatial database 1022 to determine its precise (e.g., accurate to the order of a few centimeters or less) position and orientation. The AV 130 may focus its search based on sensor data from one or more first sensor systems (e.g., GPS) by matching sensor data from one or more second sensor systems (e.g., LIDAR). If the mapping and localization information from one system is unavailable, the AV 130 may use mapping and localization information from a redundant system and/or from remote data sources.

Planning part 310 may determine how to maneuver or operate the AV 130 safely and efficiently in its environment. For instance, the planning part 310 may produce a plan for the AV 130, which can include a (reference) trajectory. Planning part 310 may receive information generated by perception, understanding, and tracking part 304. For example, the planning part 310 may receive the location, speed, and direction of the AV 130, geospatial data, data regarding objects sharing the road with the AV 130 (e.g., pedestrians, bicycles, vehicles, ambulances, buses, cable cars, trains, traffic lights, lanes, road markings, etc.) or certain events occurring during a trip (e.g., an emergency vehicle (EMV) blaring a siren, intersections, occluded areas, street closures for construction or street repairs, DPVs, etc.), user input, and other relevant data for directing the AV 130 from one point to another. The planning part 310 may determine multiple sets of one or more mechanical operations that the AV 130 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning part 310 may select from multiple backup plans to carry out. For example, while preparing to change lanes to turn right at an intersection, another vehicle may aggressively cut into the destination lane, making the lane change unsafe. The planning part 310 could have already determined an alternative plan for such an event, and upon its occurrence, help to direct the AV 130 to go around the block instead of blocking a current lane while waiting for an opening to change lanes.

Controls part 312 may manage the operation of the vehicle propulsion system 1030, the braking system 1032, the steering system 1034, the safety system 1036, and the cabin system 1038. Controls part 312 may receive a plan from the planning part 310. Controls part 312 may receive sensor signals from the sensor systems 1004-1008 as well as communicate with other stacks or components of the local compute system 1010 or a remote system (e.g., the data center 1050) to effectuate the operation of the AV 130. For example, controls part 312 may implement the final path or actions from the multiple paths or actions provided by the planning part 310. The implementation may involve turning the plan from the planning part 310 into commands for vehicle hardware controls such as the actuators that control the AV's steering, throttle, brake, and drive unit.

The communication stack 1020 may transmit and receive signals between the various stacks and other components of the AV 130 and between the AV 130, the data center 1050, the client computing device 1070, and other remote systems. The communication stack 1020 may enable the local compute system 1010 to exchange information remotely over a network. Communication stack 1020 may also facilitate local exchange of information, such as through a wired connection or a local wireless connection.

The HD geospatial database 1022 may store HD maps and related data of the streets upon which the AV 130 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable or not drivable, drivable areas that constitute links or connections, and so on. The lanes and boundaries layer may include geospatial information of road lanes and related attributes. The lanes and boundaries layer may also include 3D attributes related to lanes. The intersections layer may include geospatial information of intersections and related attributes. The traffic controls layer may include geospatial information of traffic signal lights, traffic signs, and other road objects and related attributes.

The AV operational database 1024 may store raw AV data generated by the sensor systems 1004-1008 and other components of the AV 130 and/or data received by the AV 130 from remote systems (e.g., the data center 1050, the client computing device 1070, etc.). In some embodiments, the raw AV data may include HD LIDAR point cloud data, image or video data, RADAR data, GPS data, and other sensor data that the data center 1050 may use for creating or updating AV geospatial data.

Data center 1050 may be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. Data center 1050 may include one or more computing devices remote to the local compute system 1010 for managing a fleet of AVs and AV-related services. For example, in addition to managing the AV 130, the data center 1050 may also support a ridesharing service, a delivery service, a remote/roadside assistance service, street services (e.g., street mapping, street patrol, street cleaning, street metering, parking reservation, etc.), and the like.

The data center 1050 may send and receive various signals to and from the AV 130 and the client computing device 1070. These signals may include sensor data captured by the sensor systems 1004-1008, roadside assistance requests, software updates, ridesharing pick-up and drop-off instructions, and so forth. In this example, the data center 1050 includes one or more of a data management platform 1052, an Artificial Intelligence/Machine Learning (AI/ML) platform 1054, a remote assistance platform 1058, a ridesharing platform 1060, a map management platform 1062, a remote joint map management system 376, among other systems. Data center 1050 may implement services and/or systems to facilitate operations of a fleet of AVs, including AV 130.

Data management platform 1052 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of data center 1050 may access data stored by the data management platform 1052 to provide their respective services.

The AI/ML platform 1054 may provide the infrastructure for training and evaluating machine learning algorithms for operating the AV 130, the remote assistance platform 1058, the ridesharing platform 1060, the map management platform 1062, and other platforms and systems. Using the AI/ML platform 1054, data scientists may prepare data sets from the data management platform 1052; select, design, and train machine learning models; evaluate, refine, and deploy the models; maintain, monitor, and retrain the models; and so on.

The remote assistance platform 1058 may generate and transmit instructions regarding the operation of the AV 130. For example, in response to an output of the AI/ML platform 1054 or other system of the data center 1050, the remote assistance platform 1058 may prepare instructions for one or more stacks or other components of the AV 130.

The ridesharing platform 1060 may interact with a customer of a ridesharing service via a ridesharing application 1072 executing on the client computing device 1070. The client computing device 1070 may be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general-purpose computing device for accessing the ridesharing application 1072. The client computing device 1070 may be a customer's mobile computing device or a computing device integrated with the AV 130 (e.g., the local compute system 1010). The ridesharing platform 1060 may receive requests to be picked up or dropped off from the ridesharing application 1072 and dispatch the AV 130 for the trip.

Map management platform 1062 may provide a set of tools for the manipulation and management of geographic and spatial (geospatial) and related attribute data. The data management platform 1052 may receive LIDAR point cloud data, image data (e.g., still image, video, etc.), RADAR data, GPS data, and other sensor data (e.g., raw data) from one or more AVs 1002, Unmanned Aerial Vehicles (UAVs), satellites, third-party mapping services, and other sources of geospatially referenced data.

In some embodiments, the map viewing services of map management platform 1062 may be modularized and deployed as part of one or more of the platforms and systems of the data center 1050. For example, the AI/ML platform 1054 may incorporate the map viewing services for visualizing the effectiveness of various object detection or object classification models, the remote assistance platform 1058 may incorporate the map viewing services for replaying traffic incidents to facilitate and coordinate aid, the ridesharing platform 1060 may incorporate the map viewing services into the client application 1072 to enable passengers to view the AV 130 in transit enroute to a pick-up or drop-off location, and so on.

Exemplary Processor-Based System

Figure 11:
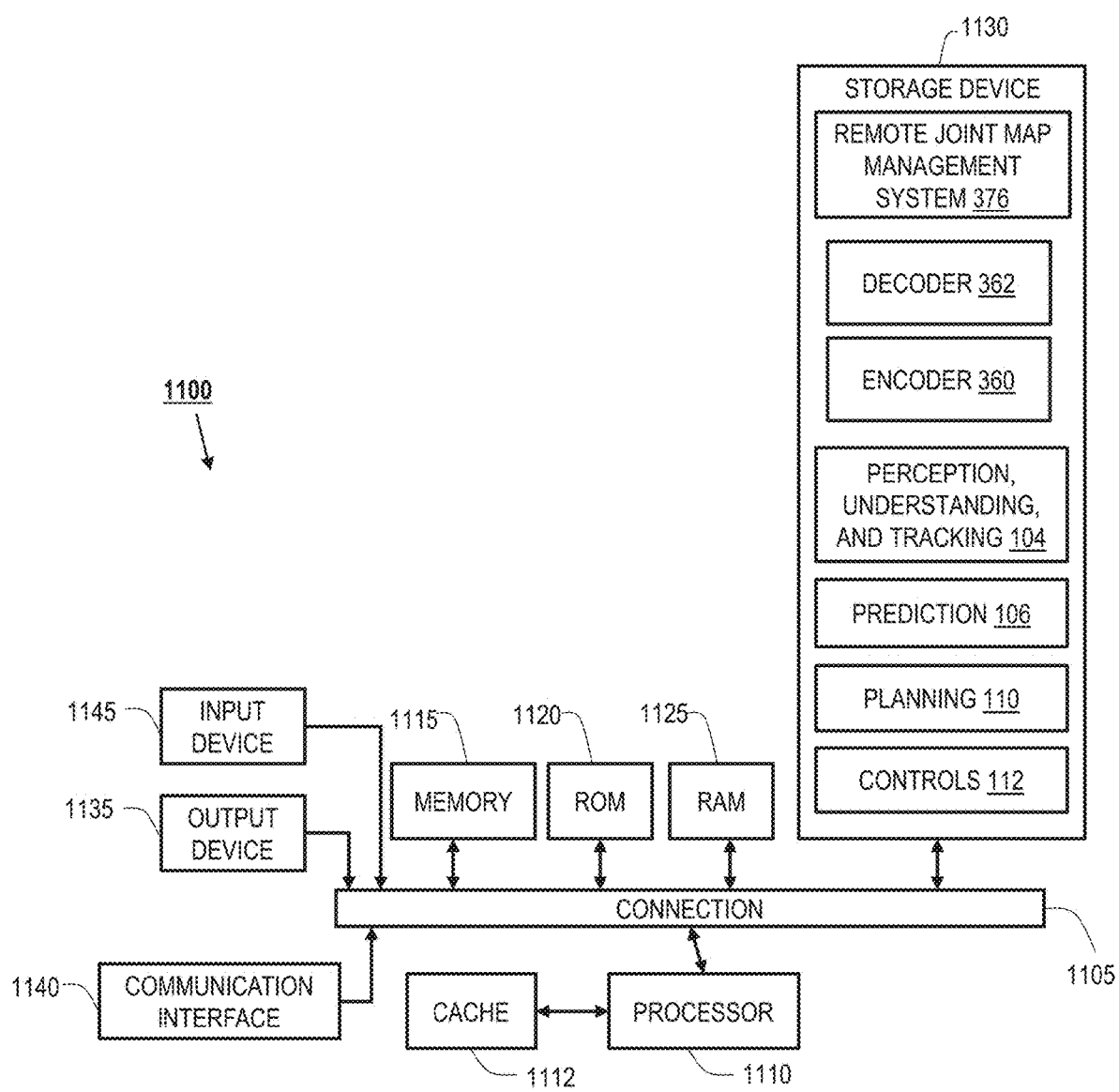
FIG. 11 illustrates an exemplary computing system with which some aspects of the subject technology may be implemented.

FIG. 11 illustrates an exemplary computing system with which some aspects of the subject technology may be implemented. For example, processor-based system 1100 may be any computing device making up, or any component thereof in which the components of the system are in communication with each other using connection 1105. Connection 1105 may be a physical connection via a bus, or a direct connection into processor 1110, such as in a chipset architecture. Connection 1105 may also be a virtual connection, networked connection, or logical connection.

In some embodiments, computing system 1100 represents the local compute system 1010 of FIG. 10. In some embodiments, one or more of the described system components represents many such components each performing some or all of the function for which the component is described. In some embodiments, the components may be physical or virtual devices.

Exemplary system 1100 includes at least one processor 1110 and connection 1105 that couples various system components including system memory 1115, such as Read-Only Memory (ROM) 1120 and Random-Access Memory (RAM) 1125 to processor 1110. at least one processor 1110 may include one or more of: Central Processing Unit (CPU), Graphical Processing Unit (GPU), machine learning processor, neural network processor, or some other suitable computing processor. Computing system 1100 may include a cache of high-speed memory 1112 connected directly with, in close proximity to, or integrated as part of processor 1110.

Processor 1110 may include any general-purpose processor and a hardware service or software service. Processor 1110 may essentially be a completely self-contained computing system, containing multiple cores or processors, a bus, memory controller, cache, etc. A multi-core processor may be symmetric or asymmetric.

Storage device 1130 may be a non-volatile and/or non-transitory and/or computer-readable memory device and may be a hard disk or other types of computer-readable media which may store data that is accessible by a computer.

Storage device 1130 may include software services, servers, services, etc., that when the code that defines such software is executed by the processor 1110, it causes the system 1100 to perform a function. Storage device 1130 may include instructions that implement functionalities of perception, understanding, and tracking part 304, prediction part 306, planning part 310, controls part 312, remote joint map management system 376, decoder 362, and encoder 360 as illustrated in the FIGURES. In some embodiments, a hardware service that performs a particular function may include the software component stored in a computer-readable medium in connection with the necessary hardware components, such as processor 1110, connection 1105, output device 1135, etc., to carry out the function.

To enable user interaction, computing system 1100 includes an input device 1145, which may represent any number of input mechanisms, such as a microphone for speech, a touch-sensitive screen for gesture or graphical input, keyboard, mouse, motion input, speech, etc. Computing system 1100 may also include output device 1135, which may be one or more of a number of output mechanisms known to those of skill in the art. In some instances, multi-modal systems may enable a user to provide multiple types of input/output to communicate with computing system 1100. Computing system 1100 may include communications interface 1140, which may generally govern and manage the user input and system output. The communication interface may perform or facilitate receipt and/or transmission of wired or wireless communications via wired and/or wireless transceivers.

SELECT EXAMPLES

Example 1 provides a method for a vehicle to share information with a further vehicle within an area, the method including receiving sensor data from one or more sensors of the vehicle sensing the area; detecting an object based on the sensor data; determining object information of the detected object based on the sensor data, the object information including location coordinates; translating the location coordinates of the detected object from a local reference frame of the vehicle to a common reference frame; compressing, using an encoder, sensor data corresponding to the detected object into an array; and transmitting the object information, the array, and a timestamp associated with the object information and the array, where the object information, the array, and the timestamp are receivable by the further vehicle which does not have the object within a field of perceivable area of one or more sensors of the further vehicle.

Example 2 provides the method of example 1, where the sensor data includes one or more of: camera sensor data and range detection sensor data.

Example 3 provides the method of example 1 or 2, where the object information further includes a motion model representing expected kinematics of the detected object.

Example 4 provides the method of any one of examples 1-3, where the object information includes a bounding box representing dimensions or size of the detected object.

Example 5 provides the method of any one of examples 1-4, where the object information includes object class information of the detected object determined by a road object classifier.

Example 6 provides the method of any one of examples 1-5, where the object information includes one or more confidence scores associated with the object information.

Example 7 provides the method of any one of examples 1-6, where the object information includes a tracking age associated with the object information.

Example 8 provides the method of any one of examples 1-7, where the object information includes an expiration time associated with the object information.

Example 9 provides the method of any one of examples 1-8, where the encoder includes a neural network based machine learning model.

Example 10 provides the method of any one of examples 1-9, where the encoder includes a transformer based machine learning model.

Example 11 provides the method of any one of examples 1-10, where the encoder is a part of a perception part of a software stack implemented on the vehicle.

Example 12 provides the method of any one of examples 1-11, where the encoder is a part of an understanding part of a software stack implemented on the vehicle.

Example 13 provides the method of any one of examples 1-12, where the array includes embeddings capturing features of the detected object.

Example 14 provides the method of any one of examples 1-13, further including receiving, by the vehicle, a request from the further vehicle to share information with the further vehicle, where the transmitting is performed in response to the request.

Example 15 provides the method of any one of examples 1-14, where transmitting includes transmitting the object information, the array, and the timestamp associated with the object to a remote joint map management system and sends information to the further vehicle.

Example 16 provides a vehicle, the vehicle including one or more sensors sensing an area; and a compute system to perform any one of the methods in examples 1-15.

Example 17 provides one or more non-transitory computer-readable media storing instructions that, when executed by one or more processors, cause the one or more processors to perform any one of the methods in examples 1-15.

Example 18 provides a method for a vehicle to receive information from a further vehicle within an area, the method including receiving, by the vehicle, object information corresponding to an object in the area, an array of feature embeddings corresponding to the object, and a timestamp associated with the object information and the array, where the object information includes location coordinates of the object in the area, and the object is not within a perceivable area of one or more sensors of the vehicle; incorporating, by the vehicle, the object information, the array, and the timestamp to a temporal map of the area; and performing, by the vehicle, one or more of: perception of objects in the area, understanding of the objects in the area, tracking of the objects in the area, prediction of the objects in the area, and path planning of the vehicle, based on the temporal map of the area.

Example 19 provides the method of example 18, further including flagging one or more of the object information and the array in the temporal map as transferred information.

Example 20 provides the method of example 18 or 19, further including determining from the object information that the object is not within a perceivable area of the one or more sensors of the vehicle; and flagging one or more of the object information and the array in the temporal map as occluded object information.

Example 21 provides the method of any one of examples 18-20, further including discarding one or more of the object information and the array if a difference between a current timestamp and the timestamp exceeds a threshold.

Example 22 provides the method of any one of examples 18-21, where the temporal map of the area includes time-stamped data about objects in the area corresponding to a period of time in the past.

Example 23 provides the method of example 22, where the period of time changes based on a speed of the vehicle.

Example 24 provides the method of any one of examples 18-23, further including translating the location coordinates of the object from a common reference frame to a local reference frame used by the vehicle.

Example 25 provides the method of any one of examples 18-24, where the performing includes using the array of feature embeddings to perceive the object by the vehicle.

Example 26 provides the method of any one of examples 18-25, where the performing includes using the array of feature embeddings to understand the object by the vehicle.

Example 27 provides the method of any one of examples 18-26, further including decoding, by a decoder of the vehicle, the array of feature embeddings.

Example 28 provides the method of example 27, where the decoder includes a neural network based machine learning model.

Example 29 provides the method of example 27 or 28, where the decoder includes a transformer based machine learning model.

Example 30 provides the method of any one of examples 27-29, where the decoder is a part of a perception part of a software stack implemented on the vehicle.

Example 31 provides the method of any one of examples 27-30, where the decoder is a part of an understanding part of a software stack implemented on the vehicle.

Example 32 provides the method of any one of examples 18-31, where: the object information further includes a motion model representing expected kinematics of the object; and the performing includes using the motion model to predict motion of the object.

Example 33 provides the method of any one of examples 18-32, where: the object information further includes a motion model representing expected kinematics of the object; and the performing includes using the motion model to plan a collision-free path.

Example 34 provides the method of any one of examples 18-33, where: the object information includes a bounding box representing dimensions or size of the object; and the performing includes using the bounding box to track objects in the area.

Example 35 provides the method of any one of examples 18-34, where: the object information includes object class information of the object; and the performing includes using the object class information to understand objects in the area.

Example 36 provides the method of any one of examples 18-35, where: the object information includes one or more confidence scores associated with the object information.

Example 37 provides the method of any one of examples 18-36, where: the object information includes a tracking age associated with the object information.

Example 38 provides the method of any one of examples 18-37, where: the object information includes an expiration time associated with the object information.

Example 39 provides the method of any one of examples 18-38, where: changing an attention of the vehicle based on the location coordinates.

Example 40 provides the method of any one of examples 18-39, further including broadcasting a request for object information to one or more vehicles located in the area.

Example 41 provides the method of example 40, where the area is defined based on a distance from the vehicle.

Example 42 provides the method of example 41, where the distance changes based on a speed of the vehicle.

Example 43 provides the method of any one of examples 18-42, further including transmitting a request for object information of the area to a remote joint map management system, where the vehicle receives the object information in response to the request.

Example 44 provides a vehicle, the vehicle including one or more sensors sensing an area; vehicle controls to cause the vehicle to navigate in the area; and a compute system to perform any one of the methods in examples 18-43.

Example 45 provides one or more non-transitory computer-readable media storing instructions that, when executed by one or more processors, cause the one or more processors to perform any one of the methods in examples 18-43.

Example 46 provides an apparatus comprising means to perform and/or for carrying out any one of the methods in examples 1-15 and 18-43.

Variations and Other Notes

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method for a vehicle to share information with a further vehicle within an area, the method comprising:
   receiving sensor data from one or more sensors of the vehicle sensing the area;
   detecting an object based on the sensor data;
   determining object information of the detected object based on the sensor data, the object information including location coordinates;
   translating the location coordinates of the detected object from a local reference frame of the vehicle to a common reference frame shared by the vehicle and the further vehicle;
   compressing, using an encoder, sensor data corresponding to the detected object into an array, wherein the array comprises feature embeddings capturing features of the detected object;
   transmitting the object information, the array, and a timestamp associated with the object information and the array, wherein the object information comprises the translated location coordinates, and wherein the object information, the array, and the timestamp are receivable by the further vehicle which does not have the object within a field of perceivable area of one or more sensors of the further vehicle;
   receiving a second array which comprises feature embeddings capturing features of a second object, wherein the second object is in the area and is outside a field of perceivable area of the one or more sensors of the vehicle;
   incorporating the object information, the array, the timestamp, and the second array to a temporal map; and
   controlling the vehicle based on the temporal map.

2. The method of claim 1, wherein the sensor data comprises one or more of: camera sensor data and range detection sensor data.

3. The method of claim 1, wherein the object information further includes one or more of:
   a motion model representing expected kinematics of the detected object;
   a bounding box representing dimensions or size of the detected object; and
   object class information of the detected object determined by a road object classifier.

4. The method of claim 1, further comprising:
   receiving:
      second object information of the second object, wherein the second object is detected by one or more sensors of the further vehicle or one or more sensors of another vehicle, and the second object information comprises second location coordinates associated with the second object; and
      a second timestamp associated with the second object information and the second array; and
   incorporating the second object information and the second timestamp to the temporal map.

5. The method of claim 1, further comprising:
   generating second sensor data associated with the one or more sensors of the further vehicle or one or more sensors of another vehicle, based on processing the second array; and
   predicting a motion or a behavior associated with the second object, based on the second sensor data,
   wherein controlling the vehicle is further based on predicting the motion or the behavior associated with the second object.

6. The method of claim 1, wherein the object information includes one or more confidence scores associated with the object information.

7. The method of claim 1, wherein the object information includes a tracking age associated with the object information.

8. The method of claim 1, wherein the object information includes an expiration time associated with the object information.

9. The method of claim 1, wherein the encoder comprises a neural network based machine learning model.

10. The method of claim 1, wherein the encoder comprises a transformer based machine learning model.

11. The method of claim 1, wherein the encoder is a part of a perception part of a software stack implemented on the vehicle.

12. The method of claim 1, wherein the encoder is a part of an understanding part of a software stack implemented on the vehicle.

13. The method of claim 1, further comprising:
   receiving, by the vehicle, a request from the further vehicle to share information with the further vehicle, wherein the transmitting is performed in response to the request.

14. The method of claim 1, wherein transmitting comprises transmitting the object information, the array, and the timestamp associated with the object to a remote joint map management system and sends-sending information to the further vehicle.

15. A vehicle, the vehicle comprising:
   one or more sensors sensing an area; and
   a compute system to:
   receive sensor data from the one or more sensors of the vehicle sensing the area; detect an object based on the sensor data;
   determine object information of the detected object based on the sensor data, the object information including location coordinates;
   translate the location coordinates of the detected object from a local reference frame of the vehicle to a common reference frame shared by the vehicle and a further vehicle;
   compress, using an encoder implemented on the compute system, sensor data corresponding to the detected object into an array, wherein the array comprises feature embeddings capturing features of the detected object;
   transmit the object information, the array, and a timestamp associated with the object information and the array to a system external to the vehicle, wherein the object information comprises the translated location coordinates;

receive a second array which comprises feature embeddings capturing features of a second object, wherein the second object is in the area and is outside a field of perceivable area of the one or more sensors of the vehicle;

incorporate the object information, the array, the timestamp, and the second array to a temporal map; and control the vehicle based on the temporal map.

16. The vehicle of claim 15, wherein the object information, the array, and the timestamp are receivable by the further vehicle which does not have the object within a field of perceivable area of one or more sensors of the further vehicle.

17. The vehicle of claim 15, wherein the system external to the vehicle is a remote joint map management system and sends information to the further vehicle.

18. One or more non-transitory computer-readable media storing instructions that, when executed by one or more processors, cause the one or more processors to:

receive sensor data from one or more sensors of a vehicle sensing an area;

detect an object based on the sensor data;

determine object information of the detected object based on the sensor data, the object information including location coordinates;

translate the location coordinates of the detected object from a local reference frame of the vehicle to a common reference frame shared by the vehicle and a further vehicle;

compress sensor data corresponding to the detected object into an array, wherein the array comprises feature embeddings capturing features of the detected object;

transmit the object information, the array, and a timestamp associated with the object information and the array to an external system, wherein the object information comprises the translated location coordinates;

receive a second array which comprises feature embeddings capturing features of a second object, wherein the second object is in the area and is outside a field of perceivable area of the one or more sensors of the vehicle;

incorporate the object information, the array, the timestamp, and the second array to a temporal map; and control the vehicle based on the temporal map.

19. The one or more non-transitory computer-readable media of claim 18, wherein the external system is a remote joint map management system and sends information to a further vehicle.

* * * * *